(12) United States Patent
Yang et al.

(10) Patent No.: US 11,895,666 B2
(45) Date of Patent: Feb. 6, 2024

(54) HARQ-LESS OPERATIONS FOR DOWNLINK AND UPLINK COMMUNICATIONS

(71) Applicant: QUALCOMM Incorporated, San Diego, CA (US)

(72) Inventors: Wei Yang, San Diego, CA (US); Jay Kumar Sundararajan, San Diego, CA (US); Hwan Joon Kwon, San Diego, CA (US); Aziz Gholmieh, Del Mar, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/446,400

(22) Filed: Aug. 30, 2021

(65) Prior Publication Data
US 2023/0065698 A1    Mar. 2, 2023

(51) Int. Cl.
*H04W 72/23* (2023.01)
*H04W 72/1263* (2023.01)
*H04L 1/00* (2006.01)
*H04L 1/1812* (2023.01)

(52) U.S. Cl.
CPC ........... *H04W 72/23* (2023.01); *H04L 1/0025* (2013.01); *H04L 1/1812* (2013.01); *H04W 72/1263* (2013.01)

(58) Field of Classification Search
CPC .............. H04W 72/23; H04W 72/1263; H04L 1/0025; H04L 1/1812; H04L 1/1896; H04L 1/1864
See application file for complete search history.

(56) References Cited

U.S. PATENT DOCUMENTS

| | | | |
|---|---|---|---|
| 11,496,236 B2* | 11/2022 | Ye | H04L 1/1861 |
| 2013/0242824 A1* | 9/2013 | Lee | H04B 1/50 370/281 |
| 2014/0044056 A1* | 2/2014 | Chen | H04L 5/0053 370/329 |
| 2020/0396023 A1 | 12/2020 | Wang et al. | |
| 2021/0227518 A1* | 7/2021 | Lee | H04L 1/08 |
| 2022/0124795 A1* | 4/2022 | Wu | H04B 7/185 |
| 2022/0174666 A1* | 6/2022 | Kou | H04L 5/0012 |

(Continued)

OTHER PUBLICATIONS

International Search Report and Written Opinion—PCT/US2022/073571—ISA/EPO—dated Oct. 19, 2022.

(Continued)

*Primary Examiner* — Shailendra Kumar

(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a grant for a communication with the base station. The UE may determine whether the communication is associated with a hybrid automatic repeat request (HARQ)-based transmission mode or a HARQ-less transmission mode. The UE may communicate with the base station based at least in part on the grant and the determination of whether the communication is associated with the HARQ-based transmission mode or the HARQ-less transmission mode. Numerous other aspects are described.

30 Claims, 12 Drawing Sheets

(56) References Cited

U.S. PATENT DOCUMENTS

2022/0239417 A1* 7/2022 Cheng ................... H04L 1/1896
2022/0386329 A1* 12/2022 Yu ........................ H04L 1/1812

OTHER PUBLICATIONS

SONY: "L1 Enhancements on PDCCH for URLLC", 3GPP TSG RAN WG1 Ad-Hoc Meeting 1901, R1-1900370—REL-16 URLLC-PDCCH V04, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019, 6 Pages, XP051593284, p. 1.

* cited by examiner

HARQ-LESS OPERATIONS FOR DOWNLINK AND UPLINK COMMUNICATIONS

FIELD OF THE DISCLOSURE

Aspects of the present disclosure generally relate to wireless communication and to techniques and apparatuses for hybrid automatic repeat request (HARQ)-less operations for downlink and uplink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a base station, a grant for a communication with the base station. The one or more processors may be configured to determine whether the communication is associated with a hybrid automatic repeat request (HARQ)-based transmission mode or a HARQ-less transmission mode. The one or more processors may be configured to communicate with the base station based at least in part on the grant and the determination of whether the communication is associated with the HARQ-based transmission mode or the HARQ-less transmission mode.

Some aspects described herein relate to a base station for wireless communication. The base station may include a memory and one or more processors coupled to the memory. The one or more processors may be configured to transmit, to a UE, a grant for a communication with the base station. The one or more processors may be configured to transmit, to the UE, an indication of whether the communication is associated with a HARQ-based transmission mode or a HARQ-less transmission mode. The one or more processors may be configured to communicate with the UE based at least in part on the grant and the indication of whether the communication is associated with the HARQ-based transmission mode or the HARQ-less transmission mode.

Some aspects described herein relate to a method of wireless communication performed by a UE. The method may include receiving, from a base station, a grant for a communication with the base station. The method may include determining whether the communication is associated with a HARQ-based transmission mode or a HARQ-less transmission mode. The method may include communicating with the base station based at least in part on the grant and the determination of whether the communication is associated with the HARQ-based transmission mode or the HARQ-less transmission mode.

Some aspects described herein relate to a method of wireless communication performed by a base station. The method may include transmitting, to a UE, a grant for a communication with the base station. The method may include transmitting, to the UE, an indication of whether the communication is associated with a HARQ-based transmission mode or a HARQ-less transmission mode. The method may include communicating with the UE based at least in part on the grant and the indication of whether the communication is associated with the HARQ-based transmission mode or the HARQ-less transmission mode.

Some aspects described herein relate to an apparatus for wireless communication. The apparatus may include means for receiving, from a base station, a grant for a communication with the base station. The apparatus may include means for determining whether the communication is associated with a HARQ-based transmission mode or a HARQ-less transmission mode. The apparatus may include means for communicating with the base station based at least in part on the grant and the determination of whether the communication is associated with the HARQ-based transmission mode or the HARQ-less transmission mode.

Some aspects described herein relate to an apparatus for wireless communication. The apparatus may include means for transmitting, to a UE, a grant for a communication with the base station. The apparatus may include means for transmitting, to the UE, an indication of whether the communication is associated with a HARQ-based transmission mode or a HARQ-less transmission mode. The apparatus may include means for communicating with the UE based at least in part on the grant and the indication of whether the communication is associated with the HARQ-based transmission mode or the HARQ-less transmission mode.

Some aspects described herein relate to a non-transitory computer-readable medium that stores a set of instructions for wireless communication by a UE. The set of instructions, when executed by one or more processors of the UE, may cause the UE to receive, from a base station, a grant for a communication with the base station. The set of instructions, when executed by one or more processors of the UE, may cause the UE to determine whether the communication is associated with a HARQ-based transmission mode or a HARQ-less transmission mode. The set of instructions, when executed by one or more processors of the UE, may cause the UE to communicate with the base station based at least in part on the grant and the determination of whether the communication is associated with the HARQ-based transmission mode or the HARQ-less transmission mode.

Some aspects described herein relate to a non-transitory computer-readable medium that stores a set of instructions for wireless communication by a base station. The set of instructions, when executed by one or more processors of the base station, may cause the base station to transmit, to a UE, a grant for a communication with the base station. The set of instructions, when executed by one or more processors of the base station, may cause the base station to transmit, to the UE, an indication of whether the communication is associated with a HARQ-based transmission mode or a HARQ-less transmission mode. The set of instructions, when executed by one or more processors of the base station, may cause the base station to communicate with the UE based at least in part on the grant and the indication of whether the communication is associated with the HARQ-based transmission mode or the HARQ-less transmission mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
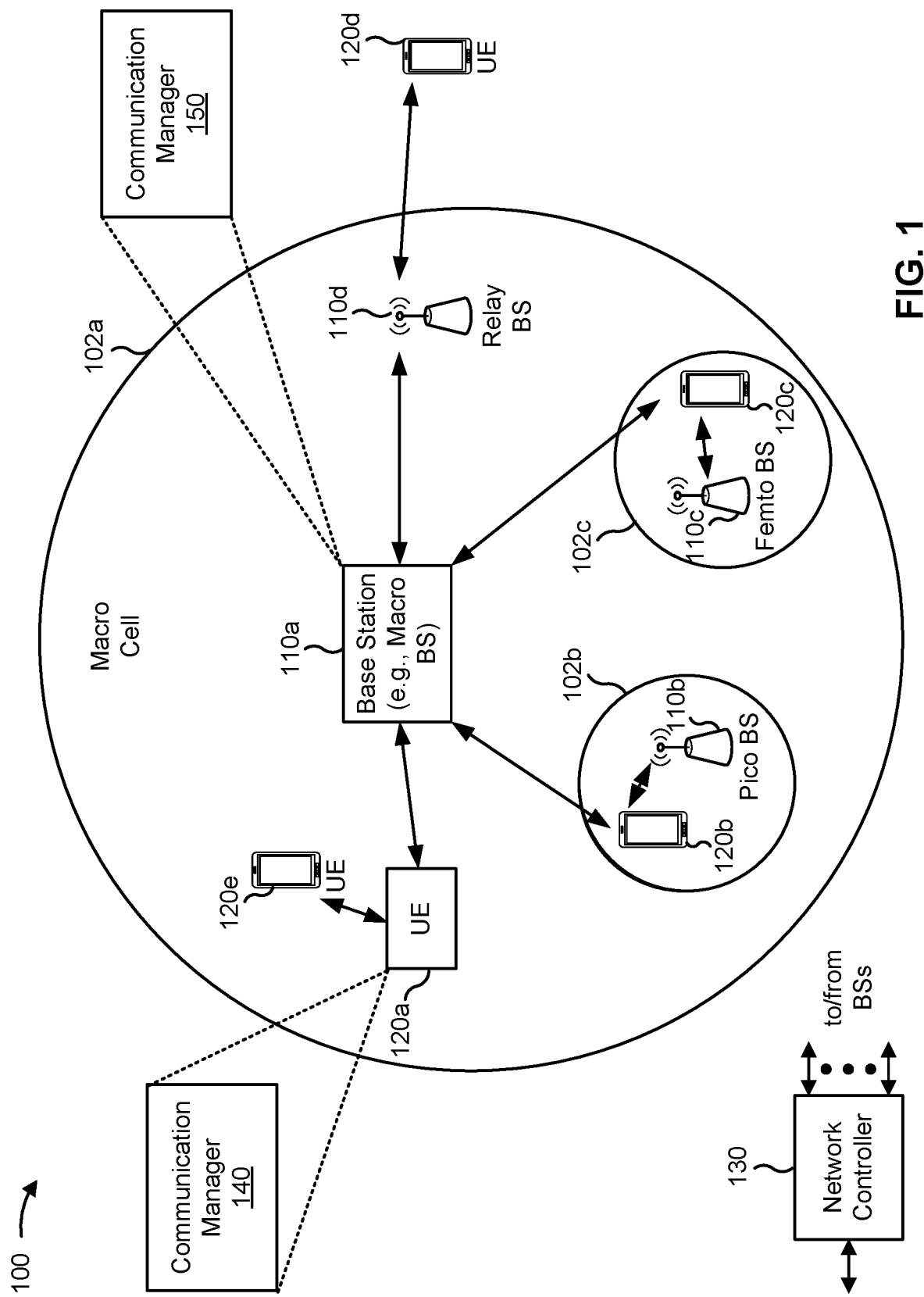
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a grant for a communication with the base station; determine whether the communication is associated with a hybrid automatic repeat request (HARQ)-based transmission mode or a HARQ-less transmission mode; and communicate with the base station based at least in part on the grant and the determination of whether the communication is associated with the HARQ-based transmission mode or the HARQ-less transmission mode. Additionally, or alternatively, the communication manager 140 may perform one or more other operations described herein.

In some aspects, the base station 110 may include a communication manager 150. As described in more detail elsewhere herein, the communication manager 150 may transmit, to a UE, a grant for a communication with the base station; transmit, to the UE, an indication of whether the communication is associated with a HARQ-based transmission mode or a HARQ-less transmission mode; and communicate with the UE based at least in part on the grant and the indication of whether the communication is associated with the HARQ-based transmission mode or the HARQ-less transmission mode. Additionally, or alternatively, the communication manager 150 may perform one or more other operations described herein.

As indicated above, FIG. 1 is provided as an example. Other examples may differ from what is described with regard to FIG. 1.

Figure 2:
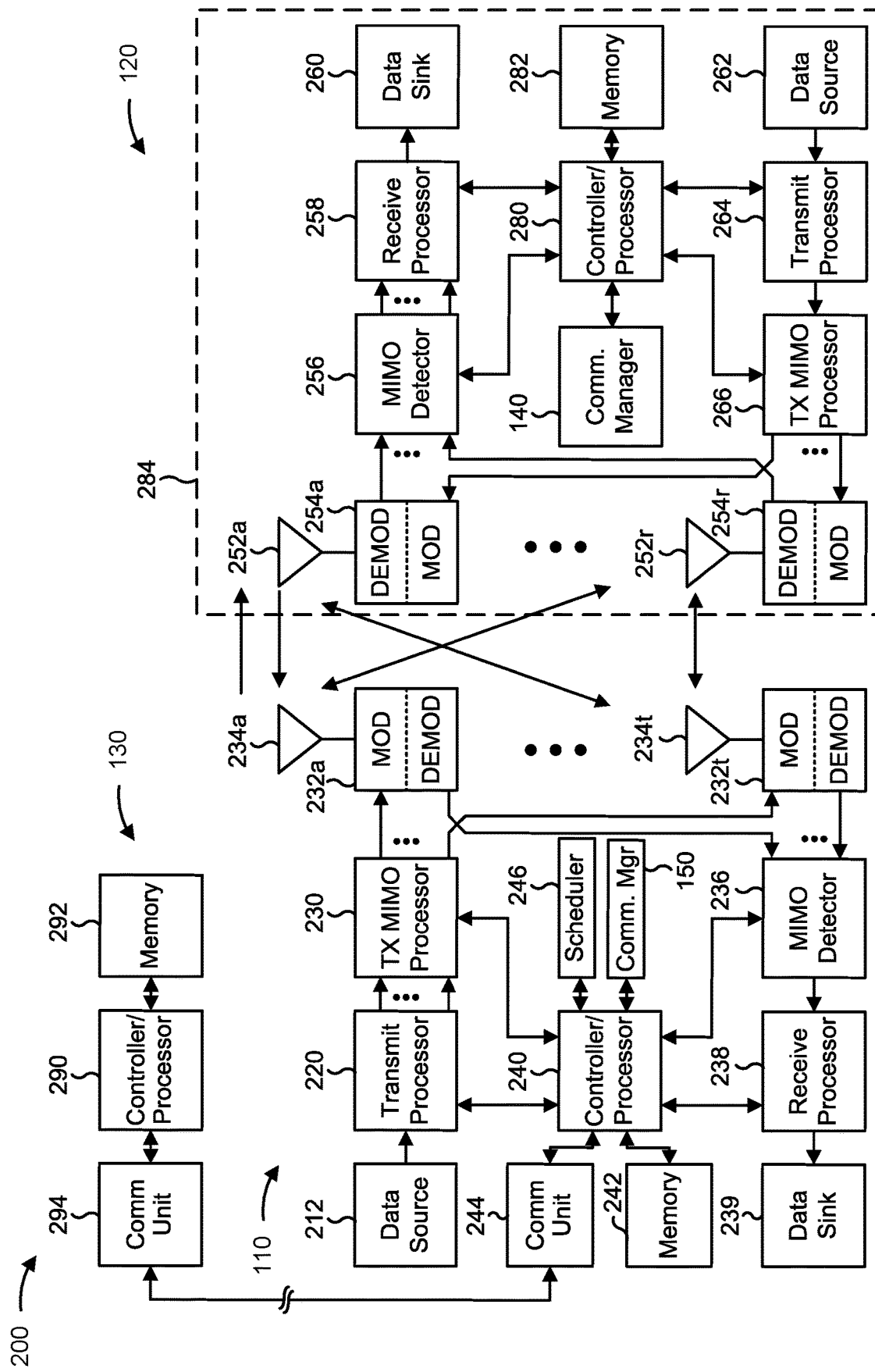
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the base station 110, the controller/processor 280 of the UE 120, and/or any other component(s) of FIG. 2 may perform one or more techniques associated with HARQ-less operations for downlink and uplink communications, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a base station, a grant for a communication with the base station; means for determining whether the communication is associated with a HARQ-based transmission mode or a HARQ-less transmission mode; and/or means for communicating with the base station based at least in part on the grant and the determination of whether the communication is associated with the HARQ-based transmission mode or the HARQ-less transmission mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a grant for a communication with the base station; means for transmitting, to the UE, an indication of whether the communication is associated with a HARQ-based transmission mode or a HARQ-less transmission mode; and/or means for communicating with the UE based at least in part on the grant and the indication of whether the communication is associated with the HARQ-based transmission mode or the HARQ-less transmission mode. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
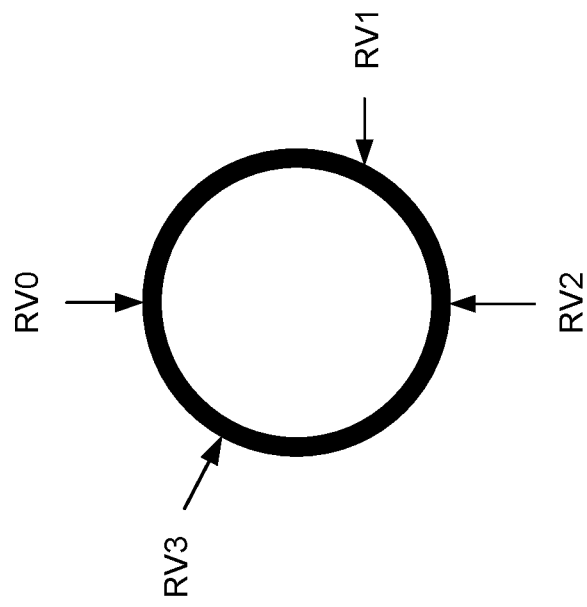
FIG. 3 is a diagram illustrating an example of a circular buffer for an incremental redundancy hybrid automatic repeat request (IR-HARQ) process, in accordance with the present disclosure.
Figure 3:

FIG. 3 is a diagram illustrating an example 300 of a circular buffer for an incremental redundancy HARQ (IR-HARQ) process, in accordance with the present disclosure.

HARQ refers to a combination of high-rate forward error correction (FEC) and automatic repeat request (ARQ) error-control. In ARQ, redundant bits may added to data to be transmitted using an error-detecting code, such as a cyclic redundancy check (CRC), and a receiver detecting a failure to correctly decode a message (e.g., based at least in part on the CRC) may request a new message from a transmitter. In HARQ, the original data may be encoded with an FEC code, and parity bits may be sent along with the message or transmitted upon request from the receiver in connection with the receiver detecting a failure to correctly decode the message. In HARQ, the receiver may store information from incorrectly decoded transport blocks (TBs) in a HARQ buffer, and when a re-transmitted TB is received, the receiver may perform soft combining to combine the information stored in the HARQ buffer with information from the re-transmitted TB and decode the combined information. For example, the receiver may use log-likelihood ratio (LLR) soft combining to combine multiple transmissions of a message. In this case, the receiver may store, in the HARQ buffer, LLR values for the demodulator output for a transmission of a message (e.g., a respective LLR value for each bit in the received message), and then combine the stored LLR values with LLR values for the demodulator output for a re-transmission of the message prior to decoding the combined LLR values. IR-HARQ refers to a HARQ process in which multiple sets of coded bits may be generated, each representing the same set of information bits. In this case, a retransmission may use a different set of coded bits from a previous transmission, with different redundancy versions generated by puncturing the encoder output.

In some examples, rate matching of low density parity check (LDPC) codes may be performed (e.g., by a UE) using a circular buffer. The circular buffer may be filled with an ordered sequence of systematic bits and parity bits. As shown, in FIG. 3, for IR-HARQ, each redundancy version (RV), RVi (e.g., RV1, RV2, RV3, and RV4 in FIG. 3), may be assigned to a starting bit location Si on the circular buffer. For IR retransmission of RVi, the coded bits are read out sequentially from the circular buffer, starting with the bit location Si. In some examples, limited buffer rate matching (LBRM) may be supported. In a case in which LBRM is configured, a UE (e.g., UE 120) may only need to store 3/2*(a number of information bits for each TB), instead of 3*(the number of information bits for each TB) (e.g., for LDPC with Base graph 1) or 5*(the number of information bits for each TB) (e.g., for LDPC with Base graph 2).

In some examples, in a receiver (e.g., UE), whenever decoding of a TB (e.g., corresponding to a HARQ process identifier (ID)) fails, the receiver (e.g., UE) may store the soft LLR bits (e.g., the LLR values for the bits of the TB) in the HARQ buffer. Each LLR value may be quantized into K bits (e.g., K=3). The HARQ buffer size for the receiver (e.g., UE) may be determined based at least in part on the transmission time interval (TTI) length and a number of HARQ processes supported/configured for the receiver (e.g., UE). For example, the HARQ buffer size for a UE may be determined as: HARQ buffer size=(max number of HARQ processes)*(TTI duration)*(peak throughput)/(LBRM factor)*(bits per LLR). As an example, to support 10 Gigabits per second (Gbps) HARQ, a UE may need 45 Mega-bytes (MB) of soft HARQ memory (e.g., with 16 HARQ processes, LBRM rate=2/3, 3 bits/LLR, and TTI duration=0.4 ms). The HARQ buffer size may scale linearly with the peak throughput supported by the UE. For example, to support 20 Gbps HARQ, the UE may need 90 MB of soft HARQ memory (e.g., with 16 HARQ processes, LBRM rate=2/3, 3 bits/LLR, and TTI duration=0.4 ms).

As indicated above, FIG. 3 is provided as an example. Other examples may differ from what is described with respect to FIG. 3.

The HARQ buffer and a layer 2 (L2) buffer may define the memory footprint for a modem of a UE. As described above in connection with FIG. 3, the HARQ buffer may be used to store the soft LLR bits associated with failed TBs while waiting for HARQ retransmissions, and the HARQ buffer size may be determined based at least in part on the TTI length and the number of HARQ processes. The L2 buffer may be used to store out-of-order packets in a radio link control (RLC)/packet data convergence protocol (PDCP) layer until receiving packets that precede the out-of-order packets in a sequence of packets. The L2 buffer size may be determined based at least in part on an RLC round trip latency (e.g., 40 ms for 30 kHz subcarrier spacing (SCS)). Both the HARQ buffer and the L2 buffer scale linearly with the peak throughput supported by the UE. For example, a 2× throughput improvement (e.g., for enhanced mobile broadband (eMBB)) may require 2× increase in the buffer size (e.g., HARQ buffer size and L2 buffer size) for a UE. Such increased memory requirements may be very costly for UEs or may prevent UEs with insufficient memory from realizing throughput improvements.

Some techniques and apparatuses described herein enable HARQ-less operations for downlink and/or uplink communications. In some aspects, a UE may receive, from a base station, a grant for a communication (e.g., a downlink communication or an uplink communication). The UE may determine whether the communication is associated with a HARQ-based transmission mode or a HARQ-less transmission mode. In some aspects, the base station may transmit, to the UE, and indication of the communication is associated with the HARQ-based transmission mode or the HARQ-less transmission mode. The UE may communicate with the base station based at least in part on the grant and the determination of whether the communication is associated with the HARQ-based transmission mode or the HARQ-less transmission mode. In some aspects, in the HARQ-less transmission mode, the UE and/or the base station may use a HARQ-less transmission scheme at the physical layer. For example, in connection with a determination that the communication is associated with the HARQ-less transmission mode, the UE may refrain from buffering LLR information associated with the communication in the HARQ buffer. As a result, a HARQ buffer size for a UE and/or a base station may be reduced, without significantly reducing the peak throughput supported by the UE.

Figure 4:
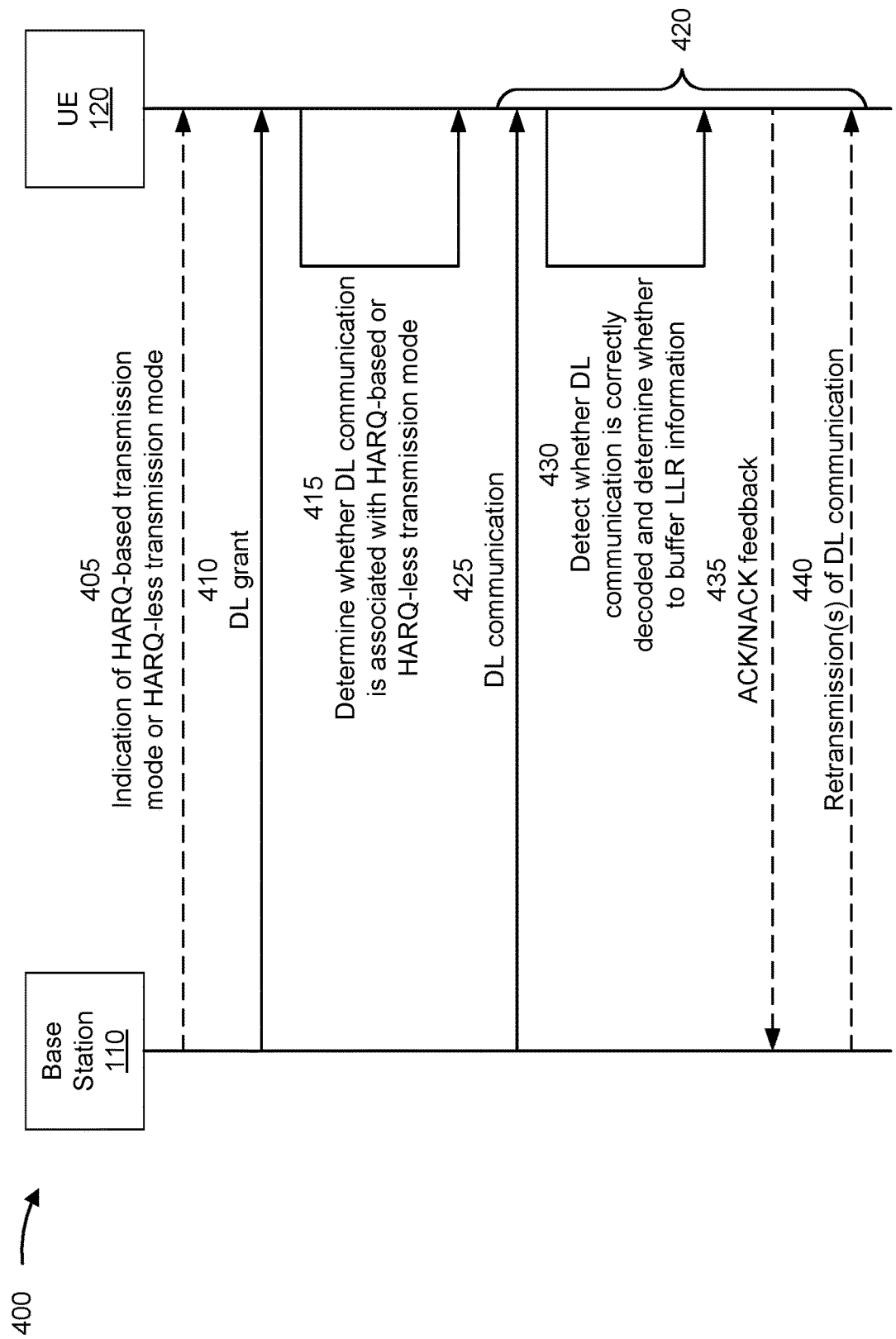
FIG. 4 is a diagram illustrating an example associated with HARQ-less operations for downlink communications, in accordance with the present disclosure.

FIG. 4 is a diagram illustrating an example 400 associated with HARQ-less operations for downlink communications, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110, may transmit to the UE 120, an indication of a HARQ-based transmission mode or a HARQ-less transmission mode. The UE 120 may receive the indication transmitted by the base station 110. In some aspects, the base station 110 may indicate, to the UE 120, to use the HARQ-based transmission mode or the HARQ-less transmission mode for one or more downlink communications (e.g., physical downlink shared channel (PDSCH) communications). In some aspects, the base station 110 may indicate, to the UE 120, to use the HARQ-less transmission mode for one or more downlink communications in order to reduce utilization of the HARQ buffer at the UE 120. For example, the base station 110 may indicate, to the UE 120, to use the HARQ-less transmission mode for one or more downlink communications based at least in part on a memory capability of the UE 120 and a determination that an amount of data stored in the HARQ buffer of the UE 120 satisfies a threshold.

In some aspects, an indication for the UE 120 to use the HARQ-less transmission mode may indicate, to a physical (PHY) layer of the UE 120, that HARQ is disabled for one or more downlink communications. In this case, the indication may indicate, to the PHY layer of the UE 120, to stop buffering LLR information associated with downlink communications in the HARQ buffer.

In some aspects, the base station 110 may transmit the indication to the UE 120 via downlink control information (DCI), via a medium access control (MAC) control element (MAC-CE), or via a radio resource control (RRC) message. In some aspects, the base station 110 may indicate, on a per downlink communication (e.g., per TB or per PDSCH) basis, whether one or more downlink communications are associated with the HARQ-based transmission mode or the HARQ-less transmission mode. For example, the indication may indicate whether UE 120 is to store (e.g., in the HARQ-based transmission mode) or not store (e.g., in the HARQ-less transmission mode) the LLR information of a TB (e.g., for a PDSCH) associated with a particular HARQ process ID in the HARQ buffer when the UE 120 fails to correctly decode the PDSCH. In some aspects, the indication may indicate (e.g., in a MAC-CE or an RRC message) one or more HARQ process IDs that are associated with the HARQ-less transmission mode. For example, the one or more HARQ process IDs associated with the HARQ-less transmission mode identify respective HARQ processes configured for HARQ-less transmission (e.g., without soft combining by the UE 120). In some aspects, the indication may include an indication of whether a particular downlink (e.g., PDSCH) communication is associated with the HARQ-based transmission mode or the HARQ-less transmission mode. In this case, the indication may be included in DCI, such as DCI associated with a downlink grant that schedules the downlink communication.

In some aspects, the base station 110 may indicate whether to use the HARQ-based transmission mode or the HARQ-less transmission mode on a per cell (e.g., per component carrier (CC)) or a per bandwidth part (BWP) basis. In this case, the base station 110 may transmit, to the UE 120, a configuration (e.g., via an RRC message or a MAC-CE) that indicates that all downlink communications (e.g., PDSCH communications) in a BWP or a cell are associated with the HARQ-based transmission mode or the HARQ-less transmission mode. For example, in a case in which the HARQ-less transmission mode is configured for a BWP or a cell, the UE 120 may use the HARQ-less transmission mode for all downlink communications in the BWP or the cell (e.g., the UE 120 may not store LLR information or perform soft combining for any downlink communications in the BWP or cell). In some aspects, in a case in which the HARQ-less transmission mode is configured for a BWP or a cell, the base station 110 may transmit DCI scheduling downlink communications (e.g., DCI for downlink grants) in the BWP or the cell using a DCI format that does not include a new data indicator (NDI) field, an RV field, and/or a HARQ process ID field. As a result, control signaling overhead for scheduling downlink communications in the HARQ-less transmission mode may be reduced.

As further shown in FIG. 4, and by reference number 410, the base station 110 may transmit, to the UE 120, a downlink grant. The UE 120 may receive the downlink grant transmitted by the base station 110. The downlink grant may include DCI (e.g., transmitted in a physical downlink control channel (PDCCH) communication) that schedules a transmission of a downlink (e.g., PDSCH) communication. For example, the DCI associated with the downlink grant may identify time and frequency resources allocated for the transmission of the downlink communication.

In some aspects, the DCI associated with the downlink grant may include an indication of whether the downlink communication scheduled by the downlink grant is associated with the HARQ-based transmission mode or the HARQ-less transmission mode. For example, the base station 110 may transmit the indication in the DCI instead of, or in addition to, an indication transmitted via a MAC-CE or an RRC message, as described above. In some aspects, the DCI may include a dedicated field for indicating whether the scheduled downlink communication is associated with the HARQ-based transmission mode or the HARQ-less transmission mode. For example, the dedicated field in the DCI can be set to a first value to indicate that HARQ combining is enabled for the downlink communication (e.g., the downlink communication is associated with the HARQ-based transmission mode) or a second value to indicate that HARQ combining is disabled for the downlink communication (e.g., the downlink communication is associated with the HARQ-less transmission mode). In some aspects, the control resource set (CORESET) in which the PDCCH communication including the DCI (e.g., the downlink grant) is received may indicate whether the scheduled downlink communications (e.g., PDSCH communication) is associated with the HARQ-based transmission mode or the HARQ-less transmission mode. For example, a PDCCH communication received in a first CORESET may indicate that the scheduled downlink communication is associated with the HARQ-based transmission mode, and a PDCCH communication received in a second CORESET may indicate that the scheduled downlink communication is associated with the HARQ-less transmission mode. In some aspects, other parameters related to the PDCCH and/or PDSCH transmission may implicitly indicate whether the PDSCH communication is associated with the HARQ-based transmission mode or the HARQ-less transmission mode. For example, the HARQ-based or HARQ-less transmission mode may be indicated by the slot index of the PDCCH communication or the scheduled PDSCH communication (e.g., an even slot index may indicate the HARQ-based transmission mode, and an odd slot index may indicate the HARQ-less transmission mode, or vice versa) or by a control channel element (CCE) index associated with the PDCCH communication including the DCI (e.g., the downlink grant).

In some aspects, a radio network temporary identifier (RNTI) associated with the DCI may indicate whether the scheduled downlink communication is associated with the HARQ-based transmission mode or the HARQ-less transmission mode. For example, the base station 110 may scramble the DCI using a first RNTI that is associated with the HARQ-based transmission mode or a second RNTI that is associated with the HARQ-less transmission mode. In some aspects, a DCI format associated with the DCI may provide the indication of whether the scheduled downlink communication is associated with the HARQ-based transmission mode or the HARQ-less transmission mode. For example, a dedicated DCI format associated with the HARQ-less transmission mode may be used for DCI that schedules a downlink communication associated with the HARQ-less transmission mode. In this case, the dedicated DCI associated with the HARQ-less transmission mode may be configured without an NDI field, an RV field, and/or a HARQ process ID field, which may result in reduced control signaling overhead for scheduling downlink communications associated with the HARQ-less transmission mode.

In some aspects, the indication may be provided using one or more other existing fields in the DCI associated with the downlink grant. For example, the indication may be provided using one or more of the RV field, the NDI field, and/or the HARQ process ID field. In some aspects, the HARQ process ID, indicated in the HARQ process ID field, may indicate whether the scheduled communication is associated with the HARQ-based transmission mode or the HARQ-less transmission mode. For example, as described above, the base station 110 may transmit, to the UE 120 (e.g., via a MAC-CE or an RRC message) an indication of one or more HARQ-process IDs associated with the HARQ-less transmission mode. In this case, a HARQ process ID, in the DCI, that is included in the one or more HARQ process IDs that are associated with the HARQ-less transmission mode may provide an indication that the downlink communication is associated with the HARQ-less transmission mode. A HARQ process ID, in the DCI, that is not included in the one or more HARQ process IDs that are associated with the HARQ-less transmission mode may provide an indication that the downlink communication is associated with the HARQ-based transmission mode.

As further shown in FIG. 4, and by reference number 415, the UE 120 may determine whether the downlink communication scheduled by the downlink grant is associated with the HARQ-based transmission mode or the HARQ-less transmission mode.

In some aspects, in a case in which the HARQ-based transmission mode or the HARQ-less transmission mode is configured per BWP or per cell, the UE 120 may determine whether the downlink communication scheduled by the downlink grant is associated with the HARQ-based transmission mode or the HARQ-less transmission mode based at least in part on a configuration, received from the base station 110, for the BWP or the cell being used for the downlink communication. In this case, the configuration may indicate that all downlink communications (e.g., PDSCH communications) in the BWP or the cell are associated with the HARQ-based transmission mode or the HARQ-less transmission mode. For example, the UE 120 may determine that the scheduled downlink communication is associated with the HARQ-less transmission mode based at least in part on a configuration that indicates that all downlink communications (e.g., PDSCH communications) in the BWP or the cell are associated with the HARQ-less transmission mode.

In some aspects, the UE 120 may receive (e.g., via a MAC-CE or an RRC message) an indication of one or more HARQ process IDs that are associated with the HARQ-less transmission mode. In this case, the UE 120 may determine whether the scheduled downlink communication is associated with the HARQ-based transmission mode or the HARQ-less transmission mode based at least in part on a HARQ process ID associated with the downlink grant (e.g., a HARQ process ID associated with the PDSCH communication). For example, the HARQ process ID may be indicated in a HARQ process ID field in the DCI associated with the downlink grant. The UE 120 may determine whether the downlink communication is associated with the HARQ-based transmission mode or the HARQ-less transmission mode based at least in part on a determination of whether the HARQ process ID associated with the downlink grant is included in the one or more HARQ process IDs that are associated with the HARQ-less transmission mode.

In some aspects, the UE 120 may determine whether the scheduled downlink communication is associated with the HARQ-based transmission mode or the HARQ-less transmission mode based at least in part on an indication provided by the DCI associated with the downlink grant. In some aspects, the indication may be included in a dedicated field, in the DCI, for indicating whether the scheduled downlink communication is associated with the HARQ-based transmission mode or the HARQ-less transmission mode. For example, the UE 120 may determine whether the dedicated field in the DCI indicates a first value associated with the HARQ-based transmission mode or a second value associated with the HARQ-less transmission mode.

In some aspects, the UE 120 may determine whether the scheduled downlink communication is associated with the HARQ-based transmission mode or the HARQ-less transmission mode based at least in part on an RNTI used to scramble the DCI associated with the downlink grant. For example, the UE 120 may determine whether the RNTI used to scramble the DCI is a first RNTI associated with the HARQ-based transmission mode or a second RNTI associated with the HARQ-less transmission mode. In some aspects, the UE 120 may determine whether the scheduled downlink communication is associated with the HARQ-based transmission mode or the HARQ-less transmission mode based at least in part on a DCI format of the DCI associated with the downlink grant. For example, the UE 120 may determine whether or not the DCI format used for the downlink grant is a dedicated DCI format for scheduling downlink communications associated with the HARQ-less transmission mode. In some aspects, the UE 120 may determine whether the scheduled downlink communication is associated with the HARQ-based transmission mode or the HARQ-less transmission mode based at least in part on an indication provided in one or more other existing fields of the DCI (e.g., one or more of the RV field, the NDI field, and/or the HARQ process ID field).

As further shown, in FIG. 4, and by reference number 420, the UE 120 and the base station 110 may communicate with each other based at least in part on the downlink grant and the determination/indication of whether the downlink communication is associated with the HARQ-based transmission mode or the HARQ-less transmission mode. In some aspects, in a case in which the downlink communication is associated with the HARQ-based transmission mode, the UE 120 and the base station 110 may communicate with each other in the HARQ-based transmission mode. In the HARQ-based transmission mode, the UE 120 may buffer LLR information for TBs that are not correctly decoded, and the UE 120 may perform soft combining of HARQ-based retransmissions of a downlink communication. In some aspects, in a case in which the downlink communication is associated with the HARQ-less transmission mode, the UE 120 and the base station 110 may communicate with each other in the HARQ-less transmission mode. In the HARQ-less transmission mode the UE 120 may not store LLR information for TBs that are not correctly decoded, and the UE 120 may not perform soft combining of downlink communications.

As shown by reference number 425, the base station 110 may transmit, to the UE 120, the downlink communication scheduled by the downlink grant. The UE 120 may receive the downlink communication based at least in part on the downlink grant, and the UE 120 may attempt to decode the downlink communication. For example, the UE 120 may attempt to decode a transport block included in the downlink communication (e.g., PDSCH communication) received from the base station 110.

As shown by reference number 430, the UE 120 may detect whether the downlink communication is correctly decoded and determine whether to buffer LLR information associated with the downlink communication. For example, the UE 120 may detect that the downlink communication is correctly decoded or that the downlink communication is not correctly decoded (e.g., a failure to correctly decode the downlink communication) based at least in part on a CRC result associated with decoding the downlink communication.

In some aspects, the UE 120, in connection with detecting a failure to correctly decode the downlink communication, may determine whether to buffer LLR information associated with the downlink communication based at least in part on the whether the downlink communication is associated with the HARQ-based transmission mode or the HARQ-less transmission mode. In some aspects, in the HARQ-based transmission mode (e.g., in connection with a determination that the downlink communication is associated with the HARQ-based transmission mode), the UE 120 may buffer LLR information associated with the downlink communication (e.g., the LLR soft bits associated with the TB transmitted in the downlink communication) in the HARQ buffer of the UE 120 in a case in which the failure to correctly decode the downlink communication is detected. In some aspects, in HARQ-less transmission mode (e.g., in connection with a determination that the downlink communication is associated with the HARQ-less transmission mode), the UE 120 may refrain from buffering/storing LLR information associated with the downlink communication in the HARQ buffer of the UE 120 in a case in which the failure to correctly decode the downlink communication is detected.

As shown by reference number 435, in some aspects, the UE 120 may transmit, to the base station 110, acknowledgement (ACK) or negative acknowledgement (NACK) feedback for the transmission of the downlink communication. As shown by reference number 440, in some aspects, the base station 110 may transmit, to the UE 120, one or more retransmissions of the downlink communication (e.g., retransmissions of the TB included in the downlink communication). In the HARQ-based transmission mode, the UE 120 may transmit an ACK in a case in which the downlink communication is correctly decoded by the UE 120 or a NACK in a case in a failure to correctly decode the downlink communication is detected by the UE 120. In the HARQ-based transmission mode, the base station 110 may transmit, to the UE 120, a retransmission of the downlink communication in connection with receiving a NACK from the UE 120, and the UE 120 may perform soft combining of the initial transmission and the re-transmission using the buffered LLR bits.

In some aspects, in the HARQ-less transmission mode, the UE 120 transmit ACK/NACK feedback for the downlink communication. For example, the UE 120, in the HARQ-less transmission mode, may transmit an ACK in a case in which the downlink communication is correctly decoded by the UE 120 or a NACK in a case in a failure to correctly decode the downlink communication is detected by the UE 120. This may allow the base station 110 to perform outer-loop link adaptation to maintain a target block error rate (BLER) at the PHY layer. In some aspects, the base station 110 may perform ARQ retransmission (e.g., without soft combining) based at least in part on the ACK/NACK feedback received from the UE 120. For example, the base station 110 may transmit one or more retransmissions of the downlink communication in connection with receiving one or more NACKs for the initial transmission and/or the retransmissions. In this case, when the PHY layer ARQ retransmissions are configured by the base station 110, the TB size does not need to be the same for the initial transmission and the retransmissions associated with a given HARQ process ID. In some aspects, the UE 120, in the HARQ-less communication mode, may decode each retransmission independently with respect to the initial transmission and any other retransmissions, and decode each retransmission without performing soft combining across transmissions at the PHY layer (e.g., without buffering LLR information in the HARQ buffer). For example, the UE 120, in the HARQ-less communication mode, may treat every transmission/retransmission of the downlink communication as a new transmission.

In some aspects, in the HARQ-less transmission mode, instead of transmitting individual ACK/NACK feedback for the initial transmission and retransmissions of the downlink communication, the UE 120 may transmit, to the base station 110, an indication of a number of ACKs (or a number of NACKs) for a plurality of transmissions of the downlink communication. In this case, the base station 110 may transmit a plurality of PDSCH transmissions/TBs to the UE 120. The UE 120 may detect an ACK (e.g., correctly decoded PDSCH) or a NACK (e.g., failure to correct decode the PDSCH) for each of the PDSCH transmissions/TBs, and the UE 120 may transmit, to the base station 110, the indication of the total number of ACKs (or total number of NACKs) for all of the plurality of PDSCH transmissions/TBs. In some aspects, in the HARQ-less transmission mode, the base station 110 may not use ARQ at the PHY layer, and residual errors at the PHY layer may be corrected at an upper layer via the use of outer code. In this case, the number of ACKs or NACKs for the plurality of PDSCH transmissions may be used by the base station 110 to drive the outer-loop link adaptation.

In some aspects, the UE 120 may determine whether or not to transmit ACK/NACK feedback in the HARQ-less transmission mode based at least in part on a configuration received from the base station 110 (e.g., in an RRC message or a MAC-CE). For example, the base station 110 may transmit, to the UE 120, a configuration that includes an indication of whether the UE 120 is to transmit individual ACK/NACK feedback or transmit a number of ACKs or NACKs for a plurality of transmissions of a downlink communication while in the HARQ-less transmission mode. In some aspects, in a case in which the base station 110 schedules/configures a downlink communication associated with the HARQ-less transmission mode, the base station 110 may be required to guarantee that every transmission of the downlink communication is self-decodable (e.g., without combining the transmission without other transmissions) by the UE 120.

As described above, the UE 120 may receive, from a base station 110, a grant for a downlink communication. The UE 120 may determine whether the downlink communication is associated with a HARQ-based transmission mode or a HARQ-less transmission mode. For example, the UE 120 may determine whether the downlink communication is associated with the HARQ-based transmission mode or the HARQ-less transmission mode based at least in part on an indication received from the base station 110. The UE 120 may communicate with the base station 110 based at least in part on the grant and the determination of whether the downlink communication is associated with the HARQ-based transmission mode or the HARQ-less transmission mode. In the HARQ-less transmission mode, the UE the UE may refrain from buffering LLR information associated with the downlink communication in the HARQ buffer. As a result, a HARQ buffer size for a UE 120 may be reduced, without significantly reducing the peak throughput supported by the UE 120.

As indicated above, FIG. 4 is provided as an example. Other examples may differ from what is described with respect to FIG. 4.

In some aspects, because a base station controls the MCS, RV, and NDI for each uplink transmission of an uplink communication (e.g., a physical uplink shared channel (PUSCH) communication) from a UE, the base station may enable HARQ-less transmission for an uplink communication by scheduling RV0 for each transmission. In this case, the UE may repeat RV0 transmissions of the uplink communication, which are self-decodable (e.g., without soft combining), and the base station may attempt to decode each transmission separately. However, in this case, the base station may be restricted from changing the TB size from the initial transmission of the uplink communication in any retransmissions of the uplink communication. That is, once the base station determines the TB size for the initial transmission, the TB may not be able to be changed in the retransmissions. This may be problematic, for example, in a case in which the base station selects a highest MCS in the initial transmission and a full bandwidth for transmitting the original transmission. In this case, the base station may not be able to reduce the MCS for a retransmission because a reduced MCS would require additional resources to transmit the same size TB and the total resources in a slot may be limited. In some cases, this may result in repeated uplink transmissions of the same size TB, which the base station may not be able to correctly decode. Furthermore, instead of receiving HARQ ACK/NACK feedback, a UE that transmits an uplink communication may determine whether or not the transmission is successfully received and decoded by the base station based on whether or not the UE receives a dynamic grant for a retransmission of the uplink communication. Accordingly, ACK/NACK feedback may not be used to enable ARQ retransmissions of uplink communications that can be decoded by the base station without soft combining.

Some techniques and apparatuses described herein enable a UE to receive, from a base station, a grant for an uplink communication. The UE may determine whether the uplink communication is associated with a HARQ-based transmission mode or a HARQ-less transmission mode. For example, the UE may determine whether the uplink communication is associated with the HARQ-based transmission mode or the HARQ-less transmission mode based at least in part on an indication received from the base station. The UE may communicate with the base station based at least in part on the grant and the determination of whether the uplink communication is associated with the HARQ-based transmission mode or the HARQ-less transmission mode. In some aspects, in the HARQ-less transmission mode, the UE may be enabled to transmit one or more retransmissions of the uplink communication without using HARQ ACK/NACK feedback, and the UE may be able to adapt the TB size from the initial transmission of the uplink communication. As a result, the base station may refrain from buffering LLR information associated with the transmissions/retransmissions of the uplink communication in a HARQ buffer of the base station, which may reduce a buffer size of the base station.

Figure 5:
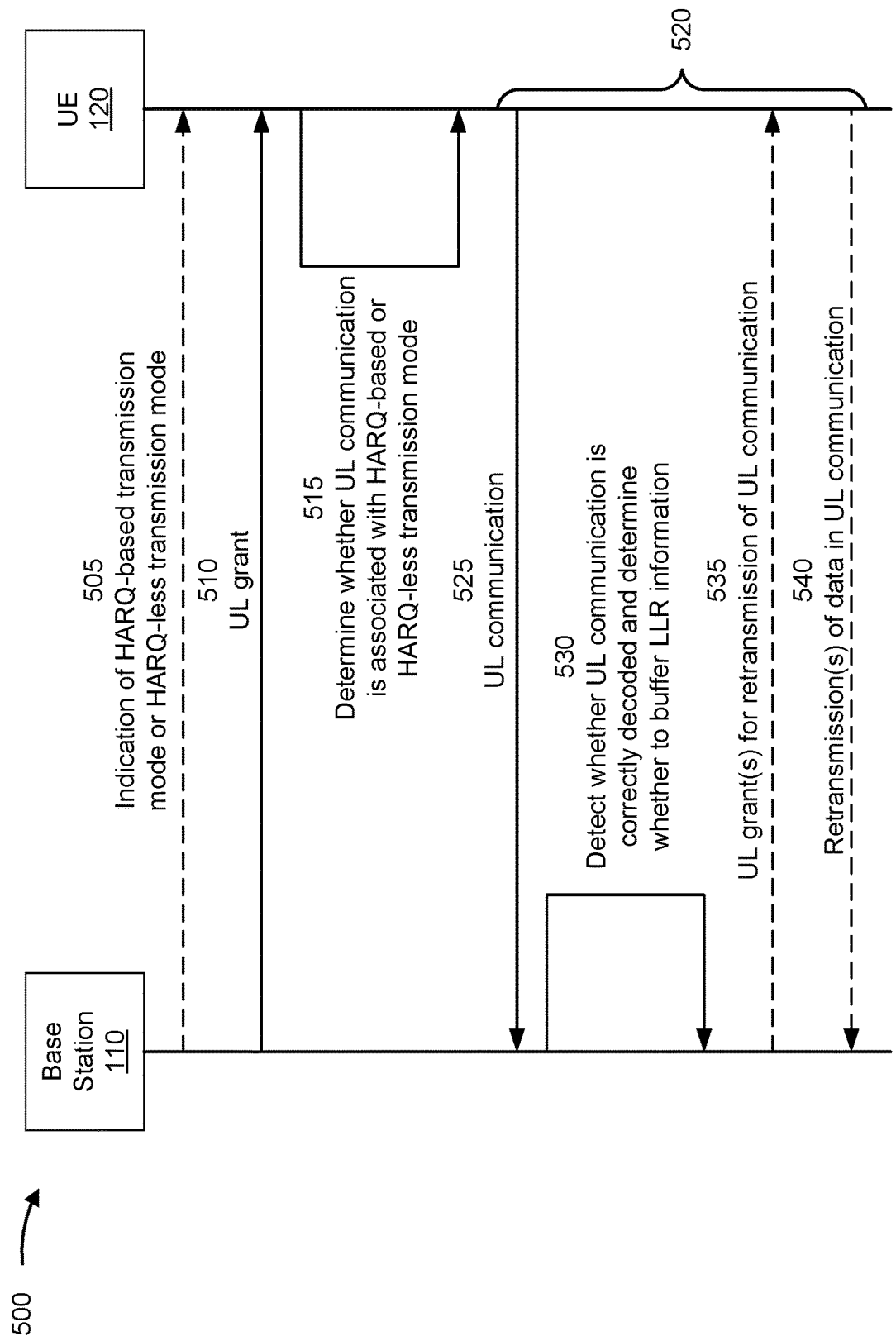
FIGS. 5-8 are diagrams illustrating examples associated with HARQ-less operations for uplink communications, in accordance with the present disclosure.

FIG. 5 is a diagram illustrating an example 500 associated with HARQ-less operations for uplink communications, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. As shown in FIG. 5, and by reference number 505, the base station 110, may transmit to the UE 120, an indication of a HARQ-based transmission mode or a HARQ-less transmission mode. The UE 120 may receive the indication transmitted by the base station 110. In some aspects, the base station 110 may indicate, to the UE 120, to use the HARQ-based transmission or the HARQ-less transmission mode for one or more uplink communications (e.g., PUSCH communications). In some aspects, the base station 110 may indicate, to the UE 120, to use the HARQ-less transmission mode for one or more uplink communications in order to reduce utilization of the HARQ buffer at the base station 110. For example, the base station 110 may indicate, to the UE 120, to use the HARQ-less transmission mode for one or more uplink communications based at least in part on a determination that an amount of data stored in the HARQ buffer of the base station 110 satisfies a threshold.

In some aspects, the base station 110 may transmit the indication to the UE 120 via DCI, via a MAC-CE, or via an RRC message. In some aspects, the base station 110 may indicate, on a per uplink communication (e.g., per TB or per PUSCH) basis, whether one or more uplink communications are associated with the HARQ-based transmission mode or the HARQ-less transmission mode. In some aspects, the indication may indicate (e.g., in a MAC-CE or an RRC message) one or more HARQ process IDs that are associated with the HARQ-less transmission mode. For example, the one or more HARQ process IDs associated with the HARQ-less transmission mode identify respective HARQ processes configured for HARQ-less transmission (e.g., without soft combining). In some aspects, the indication may include an indication of whether a particular uplink (e.g., PUSCH) communication is associated with the HARQ-based transmission mode or the HARQ-less transmission mode. In this case, the indication may be included in DCI, such as DCI associated with an uplink grant that schedules the uplink communication.

In some aspects, the base station 110 may indicate whether to use the HARQ-based transmission mode or the HARQ-less transmission mode on a per cell (e.g., per CC) or a per BWP basis. In this case, the base station 110 may transmit, to the UE 120 a configuration (e.g., via an RRC message or a MAC-CE) that indicates that all uplink communications (e.g., PUSCH communications) in a BWP or a cell are associated with the HARQ-based transmission mode or the HARQ-less transmission mode. For example, in a case in which the HARQ-less transmission mode is configured for a BWP or a cell, the UE 120 may use the HARQ-less transmission mode for all uplink communications in the BWP or the cell.

As further shown in FIG. 5, and by reference number 510, the base station 110 may transmit, to the UE 120, an uplink grant. The UE 120 may receive the uplink grant transmitted by the base station 110. The uplink grant may include DCI (e.g., transmitted in a PDCCH communication) that schedules a transmission of an uplink (e.g., PUSCH) communication. For example, the DCI associated with the uplink grant may identify time and frequency resources allocated for the transmission of the uplink communication.

In some aspects, the DCI associated with the uplink grant may include an indication of whether the uplink communication scheduled by the uplink grant is associated with the HARQ-based transmission mode or the HARQ-less transmission mode. For example, the base station 110 may transmit the indication in the DCI instead of, or in addition to, an indication transmitted via a MAC-CE or an RRC message, as described above. In some aspects, the DCI may include a dedicated field for indicating whether the scheduled uplink communication is associated with the HARQ-based transmission mode or the HARQ-less transmission mode. For example, the dedicated field in the DCI can be set to a first value to indicate that HARQ combining is enabled for the uplink communication (e.g., the uplink communication is associated with the HARQ-based transmission mode) or a second value to indicate that HARQ combining is disabled for the uplink communication (e.g., the uplink communication is associated with the HARQ-less transmission mode). In some aspects, the CORESET in which the PDCCH communication including the DCI (e.g., the uplink grant) is received may indicate whether the scheduled uplink communication (e.g., PUSCH communication) is associated with the HARQ-based transmission mode or the HARQ-less transmission mode. For example, a PDCCH communication received in a first CORESET may indicate that the scheduled uplink communication is associated with the HARQ-based transmission mode, and a PDCCH communication received in a second CORESET may indicate that the scheduled uplink communication is associated with the HARQ-less transmission mode. In some aspects, other parameters related to the PDCCH and/or PUSCH transmission may implicitly indicate whether the PUSCH communication is associated with the HARQ-based transmission mode or the HARQ-less transmission mode. For example, the HARQ-based or HARQ-less transmission mode may be indicated by the slot index of the PDCCH communication or the scheduled PUSCH communication (e.g., an even slot index may indicate the HARQ-based transmission mode, and an odd slot index may indicate the HARQ-less transmission mode, or vice versa) or by a CCE index associated with the PDCCH communication including the DCI (e.g., the uplink grant).

In some aspects, an RNTI associated with the DCI may indicate whether the scheduled uplink communication is associated with the HARQ-based transmission mode or the HARQ-less transmission mode. For example, the base station 110 may scramble the DCI using a first RNTI that is associated with the HARQ-based transmission mode or a second RNTI that is associated with the HARQ-less transmission mode. In some aspects, a DCI format associated with the DCI may provide the indication of whether the scheduled uplink communication is associated with the HARQ-based transmission mode or the HARQ-less transmission mode. For example, a dedicated DCI format associated with the HARQ-less transmission mode may be used for DCI that schedules an uplink communication associated with the HARQ-less transmission mode.

In some aspects, the indication may be provided using one or more other existing fields in the DCI associated with the uplink grant. For example, the indication may be provide using one or more of the RV field, the NDI field, and/or the HARQ process ID field. In some aspects, the HARQ process ID, indicated in the HARQ process ID field, may indicate whether the scheduled communication is associated with the HARQ-based transmission mode or the HARQ-less transmission mode. For example, as described above, the base station 110 may transmit, to the UE 120 (e.g., via a MAC-CE or an RRC message) an indication of one or more HARQ process IDs associated with the HARQ-less transmission mode. In this case, a HARQ process ID, in the DCI, that is included in the one or more HARQ process IDs that are associated with the HARQ-less transmission mode may provide an indication that the uplink communication is associated with the HARQ-less transmission mode. A HARQ process ID, in the DCI, that is not included in the one or more HARQ process IDs that are associated with the HARQ-less transmission mode may provide an indication that the uplink communication is associated with the HARQ-based transmission mode.

As further shown in FIG. 5, and by reference number 515, the UE 120 may determine whether the uplink communication scheduled by the uplink grant is associated with the HARQ-based transmission mode or the HARQ-less transmission mode.

In some aspects, in a case in which the HARQ-based transmission mode or the HARQ-less transmission mode is configured per BWP or per cell, the UE 120 may determine whether the uplink communication scheduled by the uplink grant is associated with the HARQ-based transmission mode or the HARQ-less transmission mode based at least in part on a configuration, received from the base station 110, for the BWP or the cell being used for the uplink communication. In this case, the configuration may indicate that all uplink communications (e.g., PUSCH communications) in the BWP or the cell are associated with the HARQ-based transmission mode or the HARQ-less transmission mode. For example, the UE 120 may determine that the scheduled uplink communication is associated with the HARQ-less transmission mode based at least in part on a configuration that indicates that all uplink communications (e.g., PUSCH communications) in the BWP or the cell are associated with the HARQ-less transmission mode.

In some aspects, the UE 120 may receive (e.g., via a MAC-CE or an RRC message) an indication of one or more HARQ process IDs that are associated with the HARQ-less transmission mode. In this case, the UE 120 may determine whether the scheduled uplink communication is associated with the HARQ-based transmission mode or the HARQ-less transmission mode based at least in part on a HARQ process ID associated with the uplink grant (e.g., a HARQ process ID associated with the PDSCH communication). For example, the HARQ process ID may be indicated in a HARQ process ID field in the DCI associated with the uplink grant. The UE 120 may determine whether the uplink communication is associated with the HARQ-based transmission mode or the HARQ-less transmission mode based at least in part on a determination of whether the HARQ process ID associated with the uplink grant is included in the one or more HARQ process IDs that are associated with the HARQ-less transmission mode.

In some aspects, the UE 120 may determine whether the scheduled uplink communication is associated with the HARQ-based transmission mode or the HARQ-less transmission mode based at least in part on an indication provided by the DCI associated with the uplink grant. In some aspects, the indication may be included in a dedicated field, in the DCI, for indicating whether the scheduled uplink communication is associated with the HARQ-based transmission mode or the HARQ-less transmission mode. For example, the UE 120 may determine whether the dedicated field in the DCI indicates a first value associated with the HARQ-based transmission mode or a second value associated with the HARQ-less transmission mode.

In some aspects, the UE 120 may determine whether the scheduled uplink communication is associated with the HARQ-based transmission mode or the HARQ-less transmission mode based at least in part on an RNTI used to scramble the DCI associated with the uplink grant. For example, the UE 120 may determine whether the RNTI used to scramble the DCI is a first RNTI associated with the HARQ-based transmission mode or a second RNTI associated with the HARQ-less transmission mode. In some aspects, the UE 120 may determine whether the scheduled uplink communication is associated with the HARQ-based transmission mode or the HARQ-less transmission mode based at least in part on a DCI format of the DCI associated with the uplink grant. For example, the UE 120 may determine whether or not the DCI format used for the uplink grant is a dedicated DCI format for scheduling uplink communications associated with the HARQ-less transmission mode. In some aspects, the UE 120 may determine whether the scheduled uplink communication is associated with the HARQ-based transmission mode or the HARQ-less transmission mode based at least in part on an indication provided in one or more other existing fields of the DCI (e.g., one or more of the RV field, the NDI field, and/or the HARQ process ID field).

As further shown, in FIG. 5, and by reference number 520, the UE 120 and the base station 110 may communicate with each other based at least in part on the uplink grant and the determination/indication of whether the uplink communication is associated with the HARQ-based transmission mode or the HARQ-less transmission mode. In some aspects, in a case in which the uplink communication is associated with the HARQ-based transmission mode, the UE 120 and the base station 110 may communicate with each other in the HARQ-based transmission mode. In the HARQ-based transmission mode, the base station 110 may buffer LLR information for TBs that are not correctly decoded and transmit uplink grants that scheduled retransmission of the TBs that are not correctly decoded. In the HARQ-based transmission mode, the UE 120 may transmit one or more transmissions (e.g., an initial transmission, and in some cases, one or more retransmissions) of TBs to the base station 110, and the base station 110 may perform soft combining of the TBs that are not correctly decoded in the initial transmission. In some aspects, in a case in which the uplink communication is associated with the HARQ-less transmission mode, the UE 120 and the base station 110 may communicate with each other in the HARQ-less transmission mode. In the HARQ-less transmission mode the base station 110 may not store LLR information for TBs that are not correctly decoded. In the HARQ-less transmission mode, the UE 120 may transmit one or more transmissions (e.g., an initial transmission, and in some cases, one or more retransmissions) of a data in the TB associated with an uplink communication, and the base station 110 may decode (or attempt to decode) each transmission independently without performing soft combining.

As shown by reference number 525, the UE 120 may transmit, to the base station 110, the uplink communication scheduled by the uplink grant. For example, the UE 120 may transmit an initial transmission of the uplink communication (e.g., PUSCH communication) using the resources identified for the uplink communication in the uplink grant. The base station 110 may receive the uplink communication transmitted by the UE 120, and the base station 110 may attempt to decode the uplink communication. For example, the base station 110 may attempt to decode a TB included in the uplink communication (e.g., PUSCH communication) received from the UE 120.

As shown by reference number 530, the base station 110 may detect whether the uplink communication is correctly decoded and determine whether to buffer LLR information associated with the uplink communication. For example, the base station 110 may detect that the uplink communication is correctly decoded or that the uplink communication is not correctly decoded (e.g., a failure to correctly decode the uplink communication) based at least in part on a CRC result associated with decoding the uplink communication.

In some aspects, the base station 110, in connection with detecting a failure to correctly decode the uplink communication, may determine whether to buffer LLR information associated with the uplink communication based at least in part on the whether the uplink communication is associated with the HARQ-based transmission mode or the HARQ-less transmission. In some aspects, in the HARQ-based transmission mode (e.g., in connection the uplink communication being associated with the HARQ-based transmission mode), the base station 110 may buffer LLR information associated with the uplink communication (e.g., the LLR soft bits associated with the TB transmitted in the uplink communication) in the HARQ buffer of the base station 110 in a case in which the failure to correctly decode the uplink communication is detected. In some aspects, in HARQ-less transmission mode (e.g., in connection the uplink communication being associated with the HARQ-less transmission mode), the base station 110 may refrain from buffering/storing LLR information associated with the uplink communication in the HARQ buffer of the base station 110 in a case in which the failure to correctly decode the uplink communication is detected.

As shown by reference number 535, in some aspects, the base station 110 may transmit, to the UE 120, one or more uplink grants for one or more retransmissions of the uplink communication. For example, the base station 110 may transmit, to the UE 120, an uplink grant that schedules a retransmission of the uplink communication in a case in which the base station 110 detects a failure to correctly decode a previous transmission (e.g., the initial transmission or a previous retransmission) of the uplink communication. As shown by reference number 540, in some aspects, the UE 120 may transmit one or more retransmissions of the data in the uplink communication based at least in part on the one or more uplink grants received from the base station 110. For example, the UE 120 may transmit the retransmissions of the uplink communication (or retransmission of the data in the uplink communication) as scheduled by the one or more uplink grants received from the base station 110.

In the HARQ-based transmission mode, the base station 110 may transmit, to the UE 120, an uplink grant scheduling retransmission of the uplink communication (e.g., retransmission of the TB included in the uplink communication) in connection with detecting a failure to correctly decode the initial transmission of the uplink communication. In the HARQ-based transmission mode, the UE 120 may transmit the scheduled retransmission of the uplink communication, and the base station 110 may attempt to decode the retransmission using soft combining of the retransmission with the initial transmission. In a case in which the base station 110 detects another failure to correctly decode the uplink communication, the base station 110 may transmit, to the UE 120, another uplink grant for another retransmission of the uplink communication, and the base station 110 may repeat the soft combining with addition retransmissions until the base station 110 successfully decodes the uplink transmission.

In some aspects, in the HARQ-less transmission mode, the base station 110 may enable the UE 120 to transmit code block group (CBG) based retransmissions of the data in the TB included in the initial transmission of the uplink communications. The TB included in the initial transmission of the uplink communication may be partitioned into a set of CBGs. In this case, each CBG is a block of coded bits of the data in the TB, and the set of CBGs includes a plurality of CBGs. The base station 110, in connection with detecting a failure to decode the initial transmission of the uplink communication, may transmit, to the UE 120, one or more uplink grants for retransmission of the uplink communication. The UE 120, based at least in part on the one or more uplink grants, may retransmit the data included in the uplink communication in a plurality of retransmissions, and each retransmission, of the plurality of retransmissions, may include a respective subset of the set of CBGs included in the TB transmitted in the initial transmission. Each subset of CBGs may include one CBG or multiple CBGs from the set of CBGs included in the TB transmitted in the initial transmission. The number of CBGs in each re-transmission may be less than the total number of CBGs included in the TB transmitted in the initial transmission, which may allow the retransmissions (e.g., with a smaller TB size) to be transmitted more reliably with lower coding rates. For example, in a case in which each retransmission transmitted by the UE 120 may include a respective CBG of the set of CBGs in initial TB, the UE 120 may retransmit the data in the initial TB CBG by CBG. In some aspects, the base station 110 may transmit a respective uplink grant for each retransmission of a subset CBGs. In some aspects, the base station 110 may transmit an uplink grant for retransmission of the uplink communication, and the uplink grant may allocate resources for multiple retransmissions of respective subsets of CBGs.

In some aspects, in the HARQ-less transmission mode, the base station 110 may indicate, via an NDI field and a HARQ process ID field (e.g., HARQ process number field) in an uplink grant, whether the uplink grant is a new transmission grant or a retransmission grant for an uplink transmission associated with the HARQ process indicated by the HARQ process ID. For example, an uplink grant with the NDI field not toggled (e.g., NDI=0) may be retransmission grant, and an uplink grant with the NDI field toggled (e.g., NDI=1) may be a new transmission grant. In a case in which the UE 120 receives a retransmission grant (e.g., with NDI not toggled) from the base station 110, the UE 120 may determine that the previous transmission associated with the same HARQ process (e.g., the initial transmission or a previous retransmission an uplink communication associated with the same HARQ process ID) has not been successfully decoded by the base station 110. In some aspects, in the HARQ-less transmission mode, the UE 120, in connection with receiving a retransmission grant, may recalculate the TB size based at least in part on the MCS and resource allocation indicated in the retransmission grant. For example, the initial uplink communication may include a first TB having a first size, and the UE 120 may transmit, to the base station 110, a retransmission including a second TB having a second size that is calculated based at least in part on the MCS and resource allocation indicated in the retransmission grant. In some aspects, the second TB size may be smaller than the first TB size. In this case, the UE 120 may retransmit, in the second TB, a first portion of the data associated with the uplink communication (e.g., a first portion of the data included in the first TB).

In some aspects, in the HARQ-less transmission mode, the UE 120 may generate a new TB (e.g., in connection with receiving an uplink grant for a new transmission) that includes a portion of data (e.g., one or more bits) from a previously transmitted TB (e.g., associated with a different HARQ process) that was not successfully decoded by the base station 110 and other data (e.g., one or more bits) from a MAC buffer of the UE 120 (e.g., a MAC multiplexing and assembly buffer of the UE 120). For example, as described above, in a case in which the first TB including the data associated with an uplink communication (e.g., associated with a HARQ process) is not successfully decoded and the UE 120 receives a retransmission request, the UE 120 may recalculate the TB size and transmit a retransmission including the second TB that includes the first portion of the data included in the first TB. In this case, a second portion of the data associated with the uplink communication may be a remaining portion of the data once the first portion of the data has been retransmitted in the second TB. In some aspects, the UE 120 may include the second portion of the data associated with the uplink communication in a third TB that is associated with a new uplink transmission (e.g., with a different HARQ process ID). In this case, the UE 120 may also include additional bits of data from the MAC buffer of the UE 120 based at least in part on the TB size of the third TB. For example, in a case in which the UE 120 determines that decoding of a TB failed at the base station 110, the UE 120 may treat the information bits included with that TB/uplink communication as if the information bits are new/untransmitted information bits in the MAC buffer of the UE 120.

In some aspects, in the HARQ-less transmission mode, the base station 110 may disable layer 1 (L1) (e.g., PHY layer) ARQ for uplink communications via an indication transmitted to the UE 120. In some aspects, the base station 110 may transmit, to the UE 120, a per uplink communication (e.g., per TB or per PUSCH) indication (e.g., via DCI, MAC-CE, or RRC) that disables retransmissions for one or more uplink communications. For example, the indication may be provided, for a particular uplink communication, in the DCI scheduling the uplink communication, or the indication may indicate (e.g., in a MAC-CE or an RRC message) one or more HARQ process IDs for which retransmissions of uplink communications are disabled. In some aspects, the base station 110 may transmit, to the UE 120, a configuration (e.g., via RRC or MAC-CE) that indicates that repetitions of uplink communications are disabled for all uplink communications in a cell or a BWP. In some aspects, in a case in which retransmissions are disabled for an uplink communication, the UE 120 may remove transmitted bits of data included in the uplink communication from the MAC buffer, and the UE 120 may not store the transmitted bits of data in an uplink HARQ buffer of the UE 120.

In some aspects, the base station 110 may transmit, to the UE 120, a configuration of a logical channel prioritization (LCP) restriction that indicates whether data in a logical channel (LCH) is permitted to be mapped to an uplink communication associated with the HARQ-less transmission mode and/or to a HARQ-based transmission mode. For example, the configuration may configure a respective LCP restriction for each of one or more configured LCHs. In some aspects, the LCP for an LCH may indicate that data in that LCH can be mapped to a HARQ-less uplink grant (e.g., for an uplink communication associated with the HARQ-less transmission mode) or can be mapped only to a HARQ-based uplink grant (e.g., for an uplink communication associated with the HARQ-based transmission mode). In some aspects, in the HARQ-less transmission mode (e.g., based at least in part on the determination that an uplink communication is associated with the HARQ-less transmission mode), the UE 120 may transmit, in the uplink communication, first data associated with a first LCH. In this case, the first LCH may be an LCH configured with an LCP that permits data from that LCH to be mapped to a HARQ-less uplink grant. In some aspects, in the HARQ-based transmission mode (e.g., based at least in part on the determination that an uplink communication is associated with the HARQ-based transmission mode), the UE 120 may transmit, in the uplink communication, second data associated with a second LCH. In this case, the second LCH may be an LCH configured with an LCP that permits data from that LCH to only be mapped to a HARQ-based uplink grant or an LCH configured with an LCP that permits data from the LCH to be mapped a HARQ-based uplink grant or a HARQ-less uplink grant.

As described above, the UE 120 may receive, from the base station 110, a grant for an uplink communication. The UE 120 may determine whether the uplink communication is associated with a HARQ-based transmission mode or a HARQ-less transmission mode. For example, the UE 120 may determine whether the uplink communication is associated with the HARQ-based transmission mode or the HARQ-less transmission mode based at least in part on an indication received from the base station 110. The UE 120 may communicate with the base station 110 based at least in part on the grant and the determination of whether the uplink communication is associated with the HARQ-based transmission mode or the HARQ-less transmission mode. In some aspects, in the HARQ-less transmission mode, the UE 120 may transmit one or more retransmissions of the uplink communication with a different TB size from the initial transmission of the uplink communication. As a result, the base station may refrain from buffering LLR information associated with the transmissions and retransmissions of the uplink communication in a HARQ buffer of the base station, which may reduce a buffer size of the base station.

As indicated above, FIG. 5 is provided as an example. Other examples may differ from what is described with respect to FIG. 5.

Figure 6:
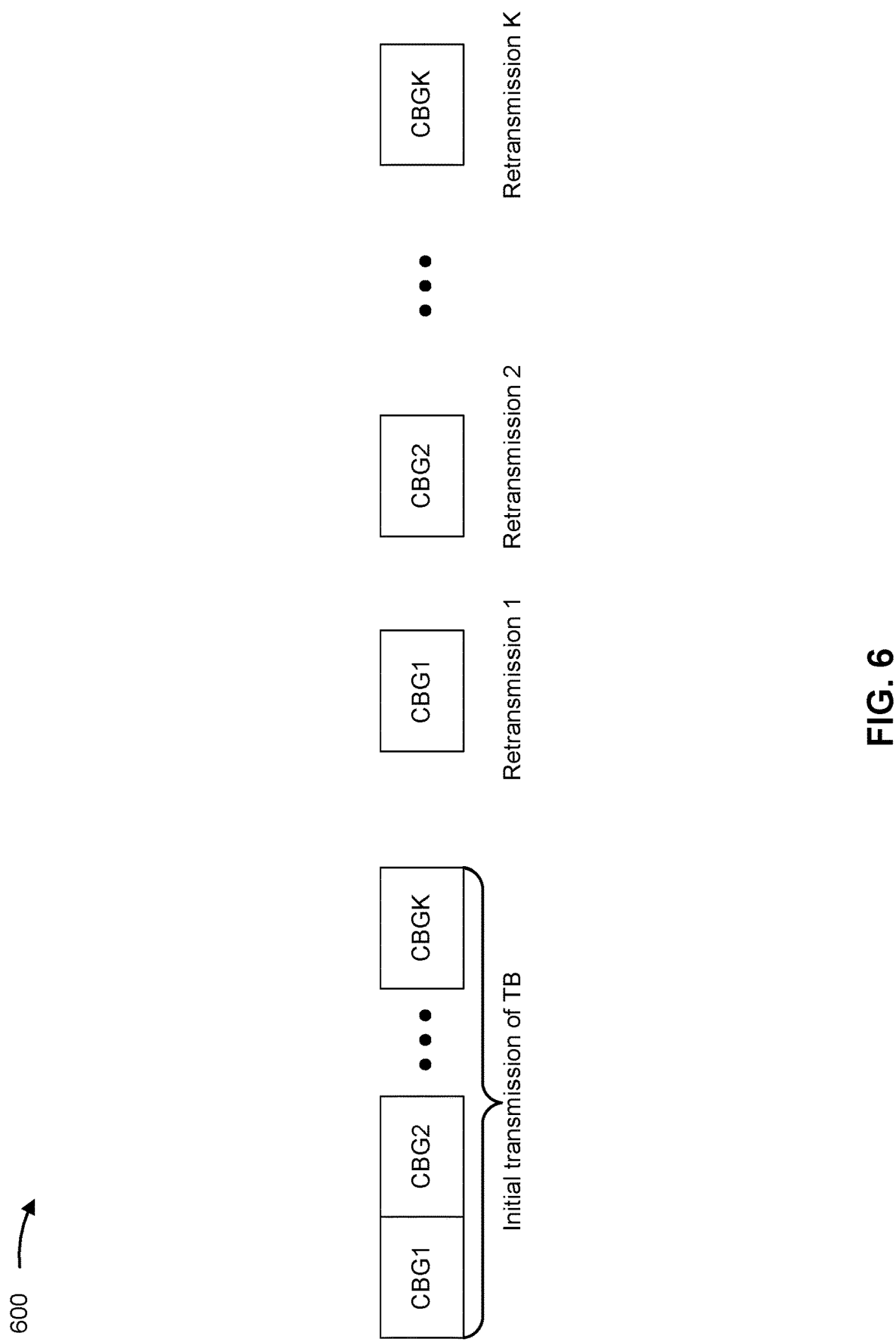

FIG. 6 is a diagram illustrating an example 600 associated with HARQ-less operations for uplink communications, in accordance with the present disclosure. As shown in FIG. 6, example 600 shows an example of CBG based retransmissions of data included an uplink communication.

As shown in FIG. 6, in the HARQ-less transmission mode, a UE (e.g., UE 120) may transmit, to a base station (e.g., base station 110) an initial transmission of a TB included in an uplink communication (e.g., PUSCH communication). The TB included in the initial transmission may be partitioned into a set of K CBGs (CBG1, CBG2, . . . , CBGK). The base station, in connection with detecting a failure to decode the initial transmission of the TB included in the uplink communication, may transmit, to the UE, one or more uplink grants for retransmission of the uplink communication. The UE, based at least in part on the one or more uplink grants, may retransmit the data included in the uplink communication in a plurality of retransmissions, and each retransmission may include a respective subset of the set of CBGs included in the TB transmitted in the initial transmission. Each subset of CBGs may include one or more CBGs from the set of CBGs included in the TB transmitted in the initial transmission. The number of CBGs in each re-transmission may be less than the total number of CBGs included in the TB transmitted in the initial transmission, which may allow the retransmissions (e.g., with a smaller TB size) to be transmitted more reliably with lower coding rates. As shown in FIG. 6, in some aspects, the UE may retransmit the data in the initial TB CBG by CBG, such that the K CBGs (CBG1, CBG2, . . . , CBGK) in the initial TB are retransmitted, to the base station, in K retransmissions (Retransmission 1, Retransmission 2, . . . , Retransmission K). In some aspects, the base station may transmit a respective uplink grant for each retransmission of a subset CBGs. In some aspects, the base station may transmit an uplink grant for retransmission of the uplink communication, and the uplink grant may allocate resources for multiple retransmissions of respective subsets of CBGs.

As indicated above, FIG. 6 is provided as an example. Other examples may differ from what is described with respect to FIG. 6.

Figure 7:
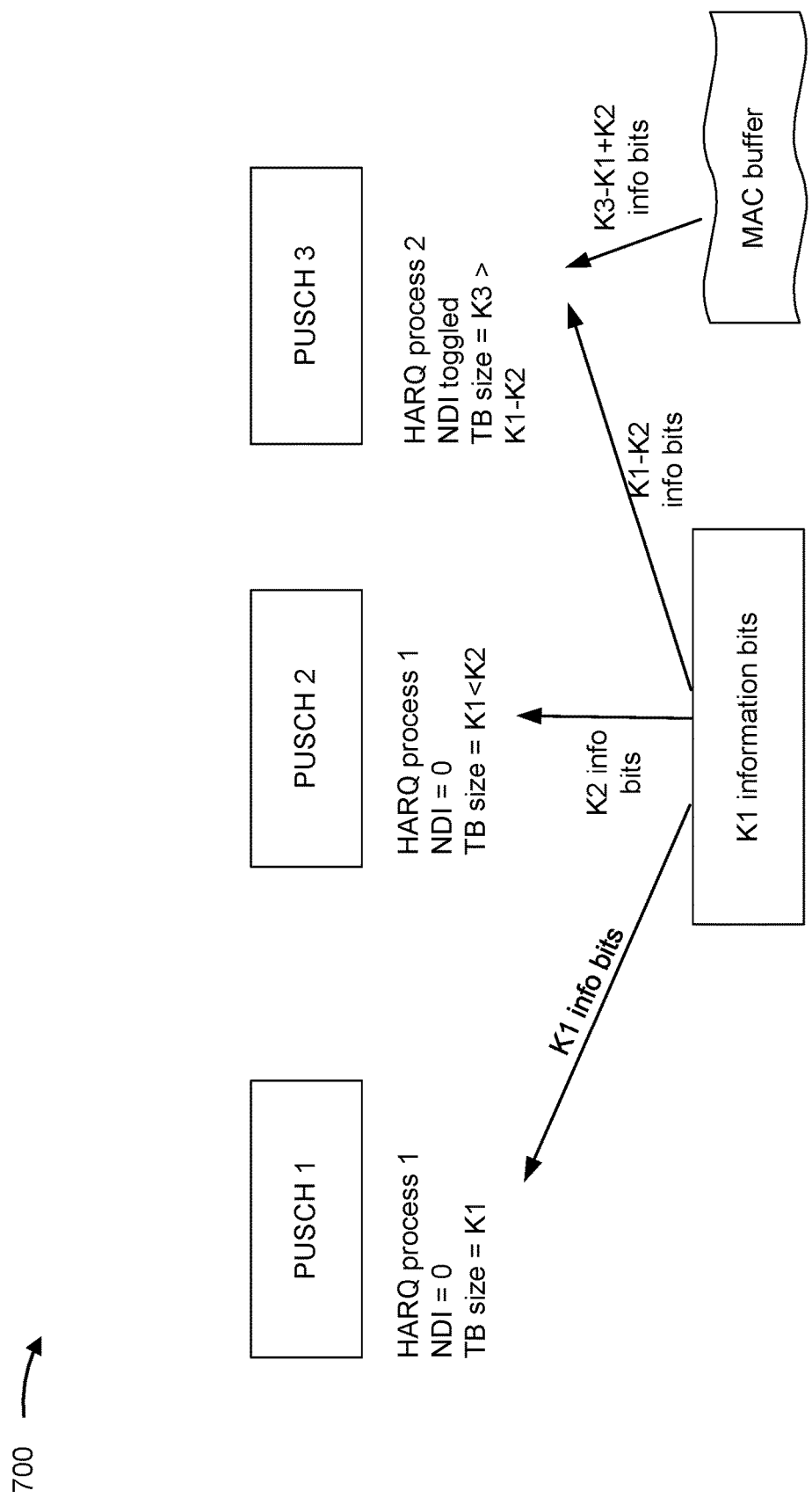

FIG. 7 is a diagram illustrating an example 700 associated with HARQ-less operations for uplink communications, in accordance with the present disclosure. As shown in FIG. 7, example 700 shows an example of retransmissions including portions of data included in an initial transmission of an uplink communication.

In some aspects, in the HARQ-less transmission mode, a base station (e.g., base station 110) may indicate, via an NDI field and a HARQ process ID field in an uplink grant, whether the uplink grant is a new transmission grant or a retransmission grant for an uplink transmission associated with the HARQ process indicated by the HARQ process ID. For example, an uplink grant with the NDI field not toggled (e.g., NDI=0) may be a retransmission grant, and an uplink grant with the NDI field toggled (e.g., NDI=1) may be a new transmission grant. In a case in which the UE 120 receives a retransmission grant (e.g., with NDI not toggled) from the base station 110, the UE 120 may determine that the previous transmission associated with the same HARQ process (e.g., the initial transmission or a previous retransmission an uplink communication associated with the same HARQ process ID) has not been successfully decoded by the base station 110. In some aspects, in the HARQ-less transmission mode, the UE 120, in connection with receiving a retransmission grant, may recalculate the TB size based at least in part on the MCS and resource allocation indicated in the retransmission grant.

As shown in FIG. 7, a first PUSCH communication (PUSCH 1) may be associated with a first HARQ process (HARQ process 1) and may include a first TB having a first TB size (K1). For example, PUSCH 1 may be an initial uplink communication associated with HARQ process 1, and the UE may transmit K1 information bits to the base station in the first TB included in PUSCH 1. The base station may transmit, to the UE, an uplink grant for a second PUSCH communication (PUSCH 2). The uplink grant for PUSCH 2 may indicate that PUSCH 2 is associated with HARQ process 1 and the NDI is not toggled (e.g., NDI=0). The UE may determine that the uplink grant for PUSCH 2 is a retransmission grant based at least in part on the indicated HARQ process being the same as the HARQ process associated with PUSCH 1 and the NDI not being toggled. The UE may recalculate the TB size based at least in part on the MCS and the resource allocation indicated in the uplink grant for PUSCH 2, resulting in a second TB having a second TB size (K2). As shown in FIG. 7, K2 may be smaller than K1. The UE may retransmit K2 information bits (of the K1 information bits included in the first TB) to the base station in the second TB included in PUSCH 2. In this case, the UE may still have K1-K2 remaining information bits from the K1 information bits included in the first TB.

In some aspects, in the HARQ-less transmission mode, the UE may generate a new TB (e.g., in connection with receiving an uplink grant for a new transmission) that includes a portion of data from a previously transmitted TB that was not successfully decoded by the base station and other data from a MAC buffer of the UE (e.g., a MAC multiplexing and assembly buffer of the UE). As shown in FIG. 7, the base station may transmit, to the UE, an uplink grant for a third PUSCH communication (e.g., PUSCH 3). The uplink grant may indicate that PUSCH 3 is associated with a second HARQ process (HARQ process 2), and the NDI may be toggled (e.g., NDI=1) in the uplink grant for PUSCH 3, which may indicate to the UE that the uplink grant for PUSCH 3 is a new transmission grant. PUSCH 3 may include a third TB having a third TB size (K3). As shown in FIG. 7, the UE may transmit, to the base station in the third TB3 of PUSCH 3, the K1-K2 remaining information bits from the K1 information bits included in the first TB and K3-K1+K2 other information bits (e.g., the number of bits remaining in the third TB) from the MAC buffer of the UE.

As indicated above, FIG. 7 is provided as an example. Other examples may differ from what is described with respect to FIG. 7.

Figure 8:
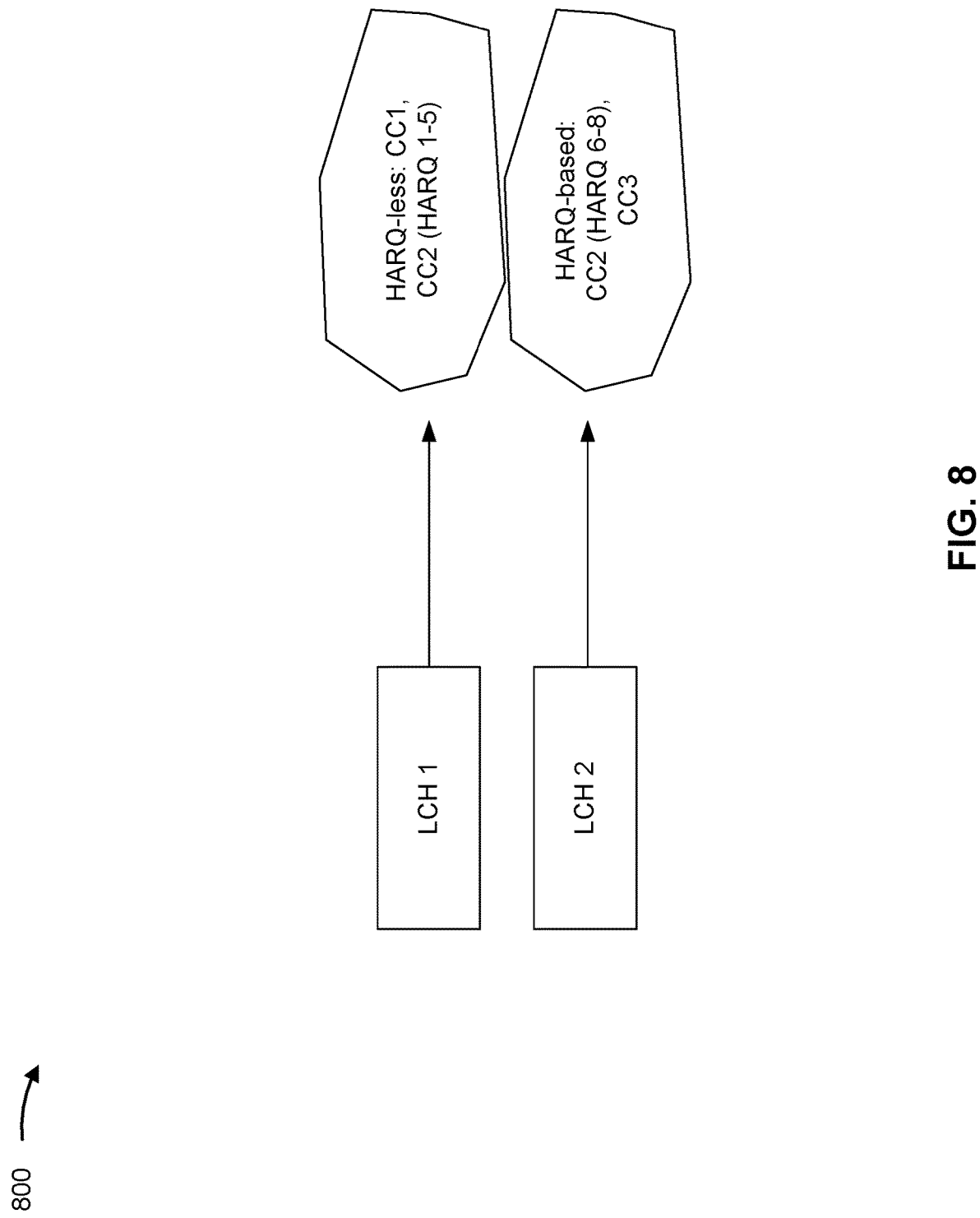

FIG. 8 is a diagram illustrating an example 800 associated with HARQ-less operations for uplink communications, in accordance with the present disclosure. As shown in FIG. 8, example 800 shows an example of LCHs configured with LCP restrictions that indicate whether data in the LCHs can be mapped to uplink communications associated with a HARQ-less transmission mode or uplink communications associated with a HARQ-based transmission mode.

As shown in FIG. 8, a first LCH (LCH 1) may be configured via an LCP such that data from LCH 1 can be mapped to HARQ-less uplink communications (e.g., uplink communications associated with the HARQ-less transmission mode). As shown in FIG. 8, all uplink communications on a first component carrier (CC1) and uplink communications associated with HARQ process IDs 1-5 on a second component carrier (CC2) may be associated with the HARQ-less transmission mode. In some aspects, the LCP may restrict data from LCH 1 to only be mapped to HARQ-less uplink communications. In some aspects, the LCP may permit data from LCH 1 to be mapped to HARQ-less uplink communications and HARQ-based uplink communications.

As further shown in FIG. 8, a second LCH (LCH 2) may be configured via an LCP such that data from LCH 2 may be mapped to HARQ-based uplink communications (e.g., uplink communications associated with the HARQ-based transmission mode). For example, the LCP may restrict data from LCH 2 to only be mapped to HARQ-based uplink communications. In this case, the data from LCH 2 may not be mapped to HARQ-less uplink communications. As shown in FIG. 8, uplink communications associated with HARQ process IDs 6-8 on CC2 and all uplink communications on a third component carrier (CC3) may be associated with the HARQ-based transmission mode.

In some aspects, based at least in part on a determination that an uplink communication is associated with the HARQ-less transmission mode, a UE (e.g., UE 120) may transmit, in the uplink communication, first data from LCH 1. In some aspects, based at least in part on a determination that an uplink communication is associated with the HARQ-based transmission mode, the UE may transmit, in the uplink communication, second data from LCH 2.

As indicated above, FIG. 8 is provided as an example. Other examples may differ from what is described with respect to FIG. 8.

Figure 9:
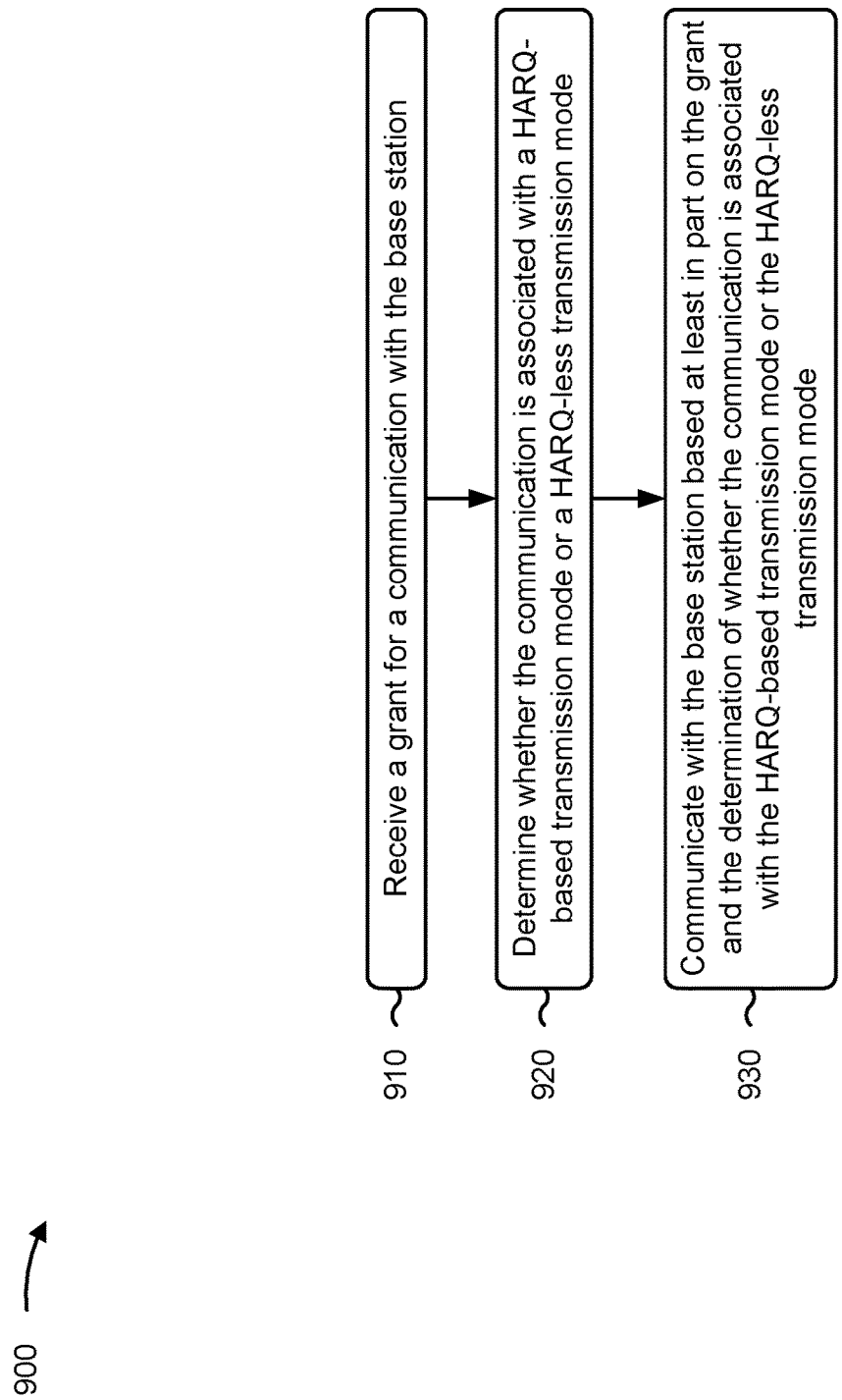
FIGS. 9-10 are diagrams illustrating example processes associated with HARQ-less operations for downlink and uplink communications, in accordance with the present disclosure.

FIG. 9 is a diagram illustrating an example process 900 performed, for example, by a UE, in accordance with the present disclosure. Example process 900 is an example where the UE (e.g., UE 120) performs operations associated with HARQ-less operations for downlink and uplink communications.

As shown in FIG. 9, in some aspects, process 900 may include receiving, from a base station, a grant for a communication with the base station (block 910). For example, the UE (e.g., using communication manager 140 and/or reception component 1102, depicted in FIG. 11) may receive, from a base station, a grant for a communication with the base station, as described above.

As further shown in FIG. 9, in some aspects, process 900 may include determining whether the communication is associated with a HARQ-based transmission mode or a HARQ-less transmission mode (block 920). For example, the UE (e.g., using communication manager 140 and/or determination component 1108, depicted in FIG. 11) may determine whether the communication is associated with a HARQ-based transmission mode or a HARQ-less transmission mode, as described above.

As further shown in FIG. 9, in some aspects, process 900 may include communicating with the base station based at least in part on the grant and the determination of whether the communication is associated with the HARQ-based transmission mode or the HARQ-less transmission mode (block 930). For example, the UE (e.g., using communication manager 140, reception component 1102, and/or transmission component 1104, depicted in FIG. 11) may communicate with the base station based at least in part on the grant and the determination of whether the communication is associated with the HARQ-based transmission mode or the HARQ-less transmission mode, as described above.

Process 900 may include additional aspects, such as any single aspect or any combination of aspects described below and/or in connection with one or more other processes described elsewhere herein.

In a first aspect, process 900 includes receiving, via downlink control information associated with the grant, an indication of whether the communication is associated with the HARQ-based transmission mode or the HARQ-less transmission mode, and the determination of whether the communication is associated with the HARQ-based transmission mode or the HARQ-less transmission mode is based at least in part on the indication.

In a second aspect, alone or in combination with the first aspect, the indication is provided by at least one of an indication in a dedicated field, in the DCI, for indicating whether the communication is associated with the HARQ-based transmission mode or the HARQ-less transmission mode, an RNTI associated with the DCI, a DCI format associated with the DCI, an indication in at least one of a redundancy version field, a new data indicator field, or a HARQ process identifier field in the DCI, a CORESET in which the DCI associated with the grant is received, a slot index of a slot in which the DCI associated with the grant is received or a slot in which the communication is scheduled, or a CCE in which the DCI associated with the grant is received.

In a third aspect, alone or in combination with one or more of the first and second aspects, process 900 includes receiving, from the base station, an indication of one or more HARQ process identifiers that are associated with the HARQ-less transmission mode, and determining whether the communication is associated with the HARQ-based transmission mode or the HARQ-less transmission mode includes determining whether a HARQ process identifier associated with the grant is included in the one or more HARQ process identifiers that are associated with the HARQ-less transmission mode.

In a fourth aspect, alone or in combination with one or more of the first through third aspects, process 900 includes receiving, from the base station, a configuration that indicates that all downlink communications or all uplink communications in a bandwidth part or a cell are associated with the HARQ-based transmission mode or the HARQ-less transmission mode, and the determination of whether the communication is associated with the HARQ-based transmission mode or the HARQ-less transmission mode is based at least in part on the configuration.

In a fifth aspect, alone or in combination with one or more of the first through fourth aspects, communicating with the base station includes communicating with the base station in the HARQ-less transmission mode based at least in part on a determination that the communication is associated with the HARQ-less transmission mode.

In a sixth aspect, alone or in combination with one or more of the first through fifth aspects, the communication is a downlink communication, and communicating with the base station in the HARQ-less transmission mode includes receiving one or more transmissions of the downlink communication without buffering LLR information for the one or more transmissions of the downlink communication, and decoding each transmission of the one or more transmissions of the downlink communication without using soft combining with another transmission of the one or more transmissions of the downlink communication.

In a seventh aspect, alone or in combination with one or more of the first through sixth aspects, communicating with the base station in the HARQ-less transmission mode further includes transmitting, to the base station, a respective ACK or NACK for each of the one or more transmissions of the downlink communication.

In an eighth aspect, alone or in combination with one or more of the first through seventh aspects, the one or more transmissions of the downlink communication include a plurality of transmissions of the downlink communication, and communicating with the base station in the HARQ-less transmission mode further includes transmitting, to the base station, an indication of a number of ACKs or a number of NACKs associated with the plurality of transmissions of the downlink communication.

In a ninth aspect, alone or in combination with one or more of the first through eighth aspects, the communication is a downlink communication, and communicating with the base station in the HARQ-less transmission mode includes detecting a failure to correctly decode a transmission of the downlink communication from the base station, and refraining from storing LLR information for the transmission of the downlink communication based at least in part on the determination that the communication is associated with the HARQ-less transmission mode.

In a tenth aspect, alone or in combination with one or more of the first through ninth aspects, the communication is an uplink communication, and communicating with the base station in the HARQ-less transmission mode includes transmitting, to the base station, the uplink communication in an initial transmission of a transport block associated with the uplink communication, wherein the transport block is partitioned into a set of code block groups, receiving, from the base station, one or more uplink grants for retransmission of the uplink communication, and transmitting, to the base station, the uplink communication in a plurality of retransmissions, wherein each retransmission of the plurality of retransmissions includes a respective subset of the set of code block groups included in the transport block transmitted in the initial transmission.

In an eleventh aspect, alone or in combination with one or more of the first through tenth aspects, the communication is an uplink communication, and communicating with the base station in the HARQ-less transmission mode includes transmitting, to the base station, data associated with the uplink communication in a first transport block having a first transport block size, receiving, from the base station, an uplink grant for retransmission of the uplink communication, and transmitting, to the base station, a first portion of the data associated with the uplink communication in a second transport block having a second transport block size determined based at least in part on a modulation and coding scheme and resource allocation indicated in the uplink grant for the retransmission of the uplink communication.

In a twelfth aspect, alone or in combination with one or more of the first through eleventh aspects, communicating with the base station in the HARQ-less transmission mode further includes receiving another uplink grant associated with a new uplink communication, and transmitting, to the base station, a third transport block associated with the new uplink communication, wherein the third transport block includes a second portion of the data associated with the uplink communication and other data from a medium access control buffer of the UE.

In a thirteenth aspect, alone or in combination with one or more of the first through twelfth aspects, the communication is an uplink communication, and communicating with the base station in the HARQ-less transmission mode includes transmitting, to the base station, data associated with the uplink communication, and removing the data associated with the uplink communication from a medium access control buffer of the UE without storing the data associated with the uplink communication in an uplink HARQ buffer of the UE.

In a fourteenth aspect, alone or in combination with one or more of the first through thirteenth aspects, the communication is an uplink communication, and communicating with the base station includes transmitting, in the uplink communication, first data associated with a first logical channel based at least in part on a determination that the communication is associated with the HARQ-less transmission mode, or transmitting, in the uplink communication, second data associated with a second logical channel based at least in part on a determination that the communication is associated with the HARQ-based transmission mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
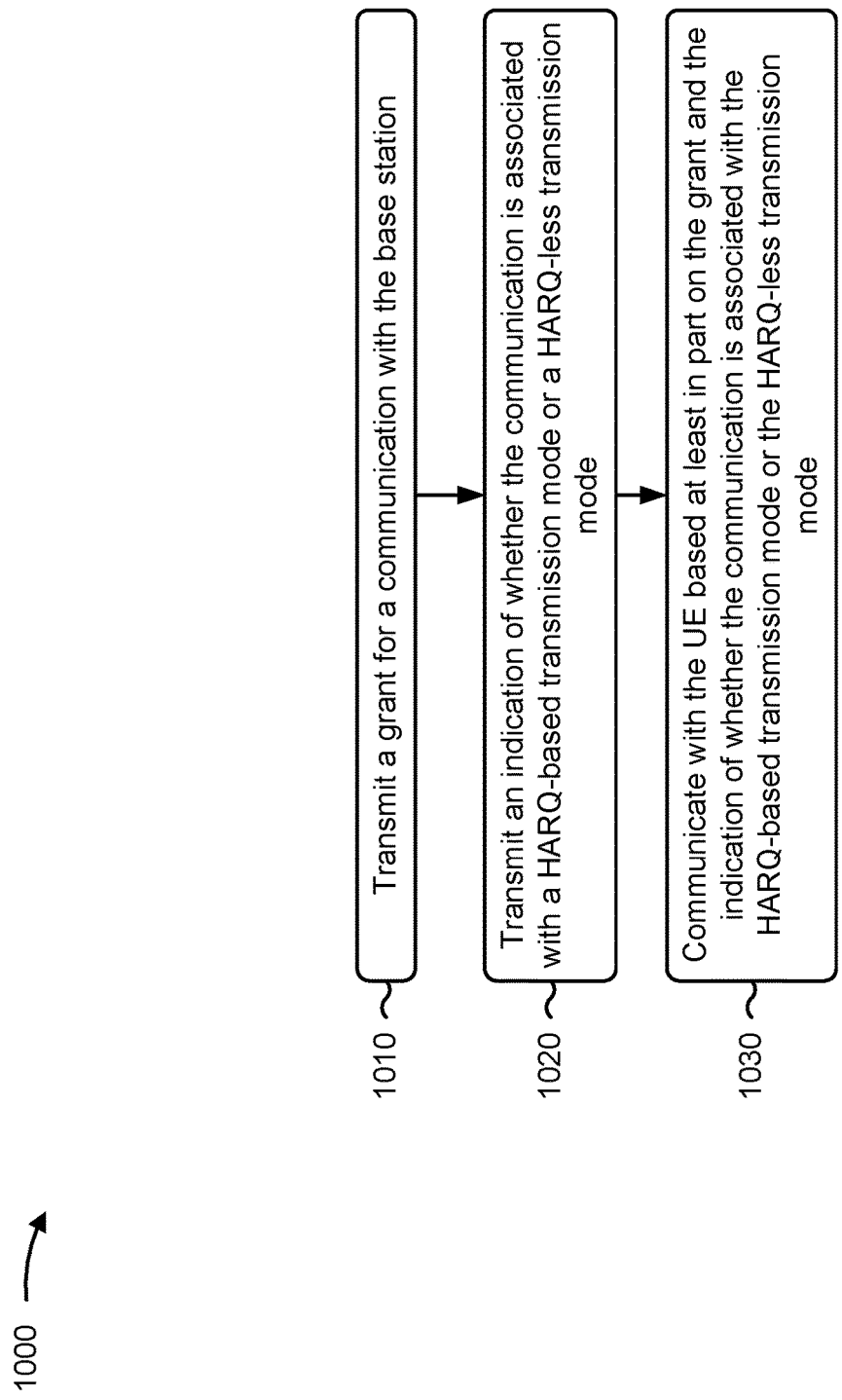

FIG. 10 is a diagram illustrating an example process 1000 performed, for example, by a base station, in accordance with the present disclosure. Example process 1000 is an example where the base station (e.g., base station 110) performs operations associated with HARQ-less operations for downlink and uplink communications.

As shown in FIG. 10, in some aspects, process 1000 may include transmitting, to a UE, a grant for a communication with the base station (block 1010). For example, the base station (e.g., using communication manager 150 and/or transmission component 1204, depicted in FIG. 12) may transmit, to a UE, a grant for a communication with the base station, as described above.

As further shown in FIG. 10, in some aspects, process 1000 may include transmitting, to the UE, an indication of whether the communication is associated with a HARQ-based transmission mode or a HARQ-less transmission mode (block 1020). For example, the base station (e.g., using communication manager 150 and/or transmission component 1204, depicted in FIG. 12) may transmit, to the UE, an indication of whether the communication is associated with a HARQ-based transmission mode or a HARQ-less transmission mode, as described above.

As further shown in FIG. 10, in some aspects, process 1000 may include communicating with the UE based at least in part on the grant and the indication of whether the communication is associated with the HARQ-based transmission mode or the HARQ-less transmission mode (block 1030). For example, the base station (e.g., using communication manager 150, reception component 1202, and/or transmission component 1204, depicted in FIG. 12) may communicate with the UE based at least in part on the grant and the indication of whether the communication is associated with the HARQ-based transmission mode or the HARQ-less transmission mode, as described above.

Process 1000 may include additional aspects, such as any single aspect or any combination of aspects described below and/or in connection with one or more other processes described elsewhere herein.

In a first aspect, transmitting the indication includes transmitting via downlink control information associated with the grant, the indication of whether the communication is associated with the HARQ-based transmission mode or the HARQ-less transmission mode.

In a second aspect, alone or in combination with the first aspect, the indication is provided by at least one of an indication in a dedicated field, in the DCI, for indicating whether the communication is associated with the HARQ-based transmission mode or the HARQ-less transmission mode, an RNTI associated with the DCI, a DCI format associated with the DCI, an indication in at least one of a redundancy version field, a new data indicator field, or a HARQ process identifier field in the DCI, a CORESET in which the DCI associated with the grant is received, a slot index of a slot in which the DCI associated with the grant is received or a slot in which the communication is scheduled, or a CCE in which the DCI associated with the grant is received.

In a third aspect, alone or in combination with one or more of the first and second aspects, the indication includes an indication of one or more HARQ process identifiers that are associated with the HARQ-less transmission mode.

In a fourth aspect, alone or in combination with one or more of the first through third aspects, process 1000 includes transmitting a configuration that indicates that all downlink communications or all uplink communications in a bandwidth part or a cell are associated with the HARQ-based transmission mode or the HARQ-less transmission mode.

In a fifth aspect, alone or in combination with one or more of the first through fourth aspects, communicating with the UE includes communicating with the UE in the HARQ-less transmission mode based at least in part on the indication indicating that the communication is associated with the HARQ-less transmission mode.

In a sixth aspect, alone or in combination with one or more of the first through fifth aspects, the communication is a downlink communication, and communicating with the UE in the HARQ-less transmission mode includes transmitting, to the UE, one or more transmissions of the downlink communication, wherein each transmission of the one or more transmissions of the downlink communication is self-decodable without soft combining.

In a seventh aspect, alone or in combination with one or more of the first through sixth aspects, communicating with the UE in the HARQ-less transmission mode further includes receiving, from the UE, a respective ACK or NACK for each of the one or more transmissions of the downlink communication.

In an eighth aspect, alone or in combination with one or more of the first through seventh aspects, the one or more transmissions of the downlink communication include a plurality of transmissions of the downlink communication, and communicating with the UE in the HARQ-less transmission mode further includes receiving, from the UE, an indication of a number of ACKs or a number of NACKs associated with the plurality of transmissions of the downlink communication.

In a ninth aspect, alone or in combination with one or more of the first through eighth aspects, the communication is an uplink communication, and communicating with the UE in the HARQ-less transmission mode includes detecting a failure to correctly decode a transmission of the uplink communication from the UE, and refraining from storing LLR information for the transmission of the uplink communication based at least in part on the determination that the communication is associated with the HARQ-less transmission mode.

In a tenth aspect, alone or in combination with one or more of the first through ninth aspects, the communication is an uplink communication, and communicating with the UE in the HARQ-less transmission mode includes receiving, from the UE, the uplink communication in an initial transmission of a transport block associated with the uplink communication, wherein the transport block is partitioned into a set of code block groups, transmitting, to the UE, one or more uplink grants for retransmission of the uplink communication based at least in part on a failure to successfully decode he transport block associated with the uplink communication, and receiving, from the UE, a plurality of retransmissions, wherein each retransmission of the plurality of retransmissions includes a respective subset of the set of code block groups included in the transport block transmitted in the initial transmission.

In an eleventh aspect, alone or in combination with one or more of the first through tenth aspects, the communication is an uplink communication, and communicating with the UE in the HARQ-less transmission mode includes receiving, from the UE, an uplink communication including a first transport block having a first transport block size, wherein the first transport block includes data associated with the uplink communication, transmitting, to the UE, an uplink grant for retransmission of the uplink communication based at least in part on a failure to correctly decode the first transport block, and receiving, from the UE, a first portion of the data associated with the uplink communication in a second transport block having a second transport block size determined based at least in part on a modulation and coding scheme and resource allocation indicated in the uplink grant for the retransmission of the uplink communication.

In a twelfth aspect, alone or in combination with one or more of the first through eleventh aspects, communicating with the UE in the HARQ-less transmission mode further includes transmitting, to the UE, another uplink grant associated with a new uplink communication, and receiving, from the UE, a third transport block associated with the new uplink communication, wherein the third transport block includes a second portion of the data associated with the uplink communication and other data from a medium access control buffer of the UE.

In a thirteenth aspect, alone or in combination with one or more of the first through twelfth aspects, the communication is an uplink communication, and communicating with the UE in the HARQ-less transmission mode includes transmitting, to the UE, an indication to disable repetitions for the uplink communication based at least in part on the communication being associated with the HARQ-less transmission mode, and receiving, from the UE, a transmission of the uplink communication.

In a fourteenth aspect, alone or in combination with one or more of the first through thirteenth aspects, the communication is an uplink communication, and communicating with the base station includes receiving, in the uplink communication, first data associated with a first logical channel based at least in part on a determination that the communication is associated with the HARQ-less transmission mode, or receiving, in the uplink communication, second data associated with a second logical channel based at least in part on a determination that the communication is associated with the HARQ-based transmission mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
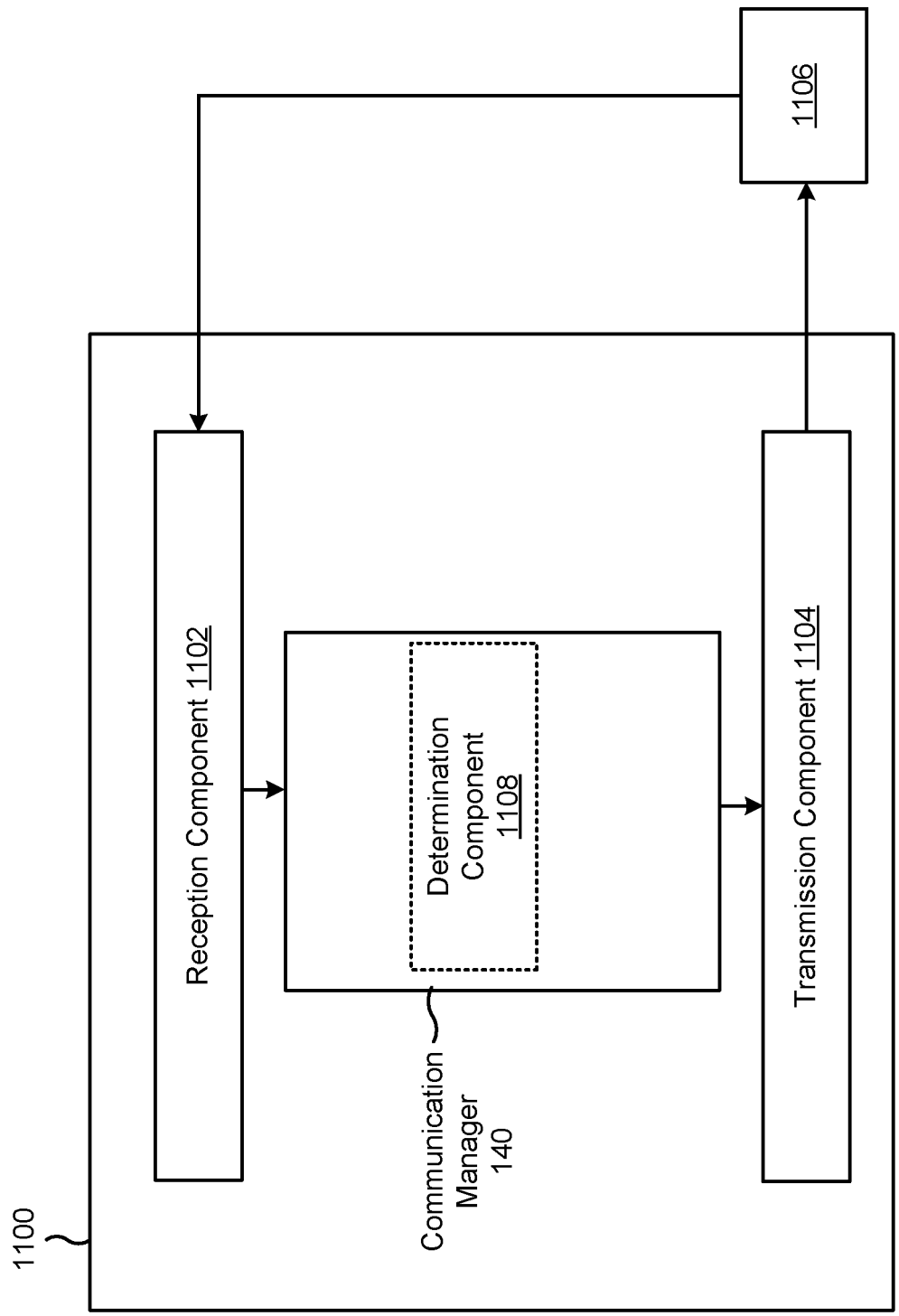
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station, a grant for a communication with the base station. The determination component 1108 may determine whether the communication is associated with a HARQ-based transmission mode or a HARQ-less transmission mode. The reception component 1102 and/or the transmission component 1104 may communicate with the base station based at least in part on the grant and the determination of whether the communication is associated with the HARQ-based transmission mode or the HARQ-less transmission mode.

The reception component 1102 may receive, via downlink control information associated with the grant, an indication of whether the communication is associated with the HARQ-based transmission mode or the HARQ-less transmission mode, wherein the determination of whether the communication is associated with the HARQ-based transmission mode or the HARQ-less transmission mode is based at least in part on the indication.

The reception component 1102 may receive, from the base station, an indication of one or more HARQ process identifiers that are associated with the HARQ-less transmission mode, wherein determining whether the communication is associated with the HARQ-based transmission mode or the HARQ-less transmission mode comprises determining whether a HARQ process identifier associated with the grant is included in the one or more HARQ process identifiers that are associated with the HARQ-less transmission mode.

The reception component 1102 may receive, from the base station, a configuration that indicates that all downlink communications or all uplink communications in a bandwidth part or a cell are associated with the HARQ-based transmission mode or the HARQ-less transmission mode, wherein the determination of whether the communication is associated with the HARQ-based transmission mode or the HARQ-less transmission mode is based at least in part on the configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
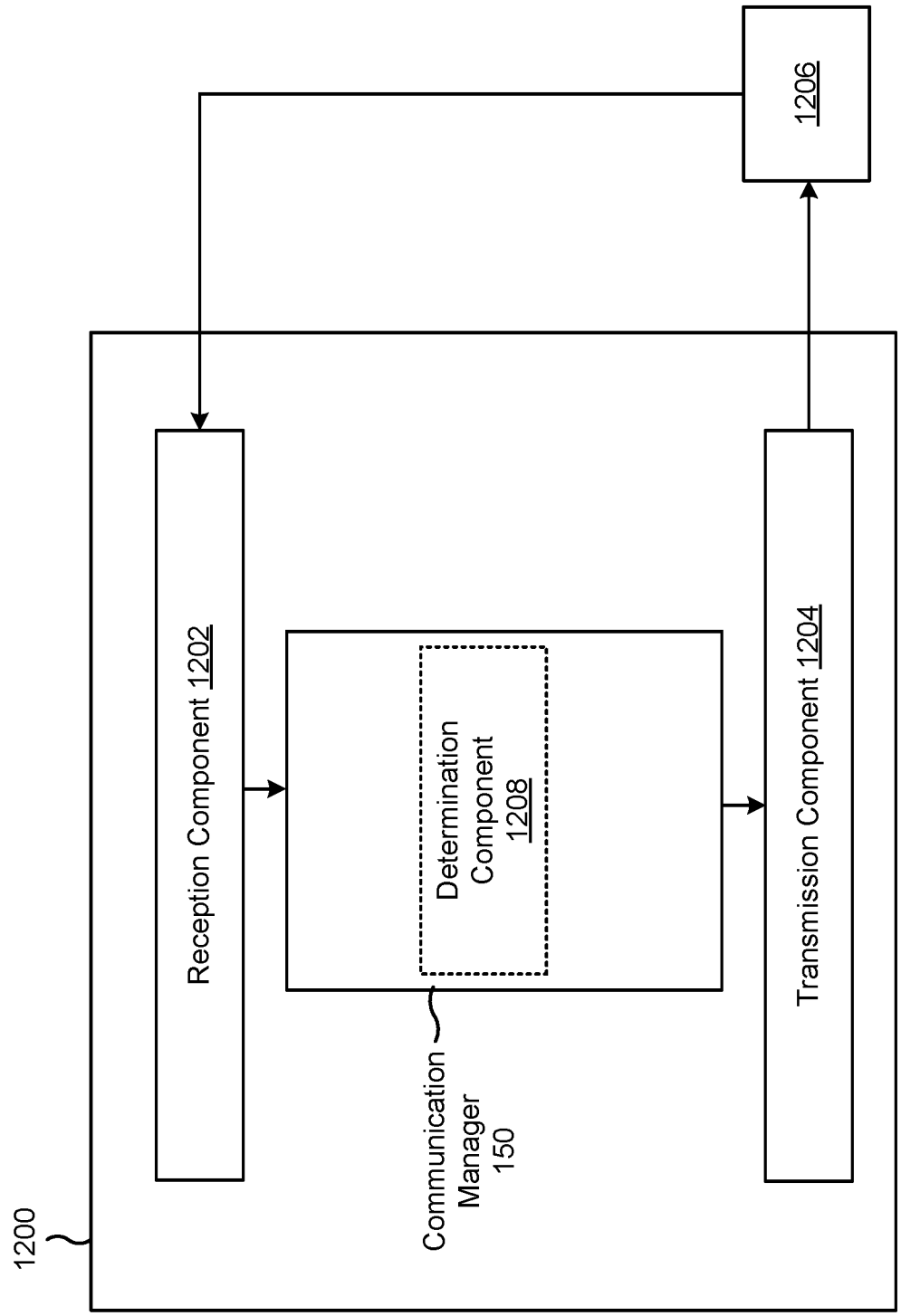

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/ processor, a memory, or a combination thereof, of the base station described in connection with FIG. 2. In some aspects, the transmission component 1204 may be co-located with the reception component 1202 in a transceiver.

The transmission component 1204 may transmit, to a UE, a grant for a communication with the base station. The transmission component 1204 may transmit, to the UE, an indication of whether the communication is associated with a HARQ-based transmission mode or a HARQ-less transmission mode. The reception component 1202 and/or the transmission component 1204 may communicate with the UE based at least in part on the grant and the indication of whether the communication is associated with the HARQ-based transmission mode or the HARQ-less transmission mode.

The determination component 1208 may determine whether to indicate that the communication is associated with the HARQ-based transmission mode or the HARQ-less transmission mode.

The transmission component 1204 may transmit a configuration that indicates that all downlink communications or all uplink communications in a bandwidth part or a cell are associated with the HARQ-based transmission mode or the HARQ-less transmission mode.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a grant for a communication with the base station; determining whether the communication is associated with a hybrid automatic repeat request (HARQ)-based transmission mode or a HARQ-less transmission mode; and communicating with the base station based at least in part on the grant and the determination of whether the communication is associated with the HARQ-based transmission mode or the HARQ-less transmission mode.

Aspect 2: The method of Aspect 1, further comprising: receiving, via downlink control information (DCI) associated with the grant, an indication of whether the communication is associated with the HARQ-based transmission mode or the HARQ-less transmission mode, wherein the determination of whether the communication is associated with the HARQ-based transmission mode or the HARQ-less transmission mode is based at least in part on the indication.

Aspect 3: The method of Aspect 2, wherein the indication is provided by at least one of: an indication in a dedicated field, in the DCI, for indicating whether the communication is associated with the HARQ-based transmission mode or the HARQ-less transmission mode, a radio network temporary identifier (RNTI) associated with the DCI, a DCI format associated with the DCI, an indication in at least one of a redundancy version field, a new data indicator field, or a HARQ process identifier field in the DCI, a control resource set (CORESET) in which the DCI associated with the grant is received, a slot index of a slot in which the DCI associated with the grant is received or a slot in which the communication is scheduled, or a control channel element (CCE) in which the DCI associated with the grant is received.

Aspect 4: The method of any of Aspects 1-3, further comprising: receiving, from the base station, an indication of one or more HARQ process identifiers that are associated with the HARQ-less transmission mode, wherein determining whether the communication is associated with the HARQ-based transmission mode or the HARQ-less transmission mode comprises determining whether a HARQ process identifier associated with the grant is included in the one or more HARQ process identifiers that are associated with the HARQ-less transmission mode.

Aspect 5: The method of any of Aspects 1-4, further comprising: receiving, from the base station, a configuration that indicates that all downlink communications or all uplink communications in a bandwidth part or a cell are associated with the HARQ-based transmission mode or the HARQ-less transmission mode, wherein the determination of whether the communication is associated with the HARQ-based transmission mode or the HARQ-less transmission mode is based at least in part on the configuration.

Aspect 6: The method of any of Aspects 1-5, wherein communicating with the base station comprises: communicating with the base station in the HARQ-less transmission mode based at least in part on a determination that the communication is associated with the HARQ-less transmission mode.

Aspect 7: The method of Aspect 6, wherein the communication is a downlink communication, and wherein communicating with the base station in the HARQ-less transmission mode comprises: receiving one or more transmissions of the downlink communication without buffering log-likelihood ratio (LLR) information for the one or more transmissions of the downlink communication; and decoding each transmission of the one or more transmissions of the downlink communication without using soft combining with another transmission of the one or more transmissions of the downlink communication.

Aspect 8: The method of any of Aspect 7, wherein communicating with the base station in the HARQ-less transmission mode further comprises: transmitting, to the base station, a respective acknowledgement (ACK) or negative acknowledgment (NACK) for each of the one or more transmissions of the downlink communication.

Aspect 9: The method of any of Aspect 7, wherein the one or more transmissions of the downlink communication include a plurality of transmissions of the downlink communication, and wherein communicating with the base station in the HARQ-less transmission mode further comprises: transmitting, to the base station, an indication of a number of acknowledgements (ACKs) or a number of negative acknowledgments (NACKs) associated with the plurality of transmissions of the downlink communication.

Aspect 10: The method of any of Aspects 6-9, wherein the communication is a downlink communication, and wherein communicating with the base station in the HARQ-less transmission mode comprises: detecting a failure to correctly decode a transmission of the downlink communication from the base station; and refraining from storing log-likelihood ratio (LLR) information for the transmission of the downlink communication based at least in part on the determination that the communication is associated with the HARQ-less transmission mode.

Aspect 11: The method of Aspect 6, wherein the communication is an uplink communication, and wherein communicating with the base station in the HARQ-less transmission mode comprises: transmitting, to the base station, the uplink communication in an initial transmission of a transport block associated with the uplink communication, wherein the transport block is partitioned into a set of code block groups; receiving, from the base station, one or more uplink grants for retransmission of the uplink communication; and re-transmitting, to the base station, the uplink communication in a plurality of retransmissions, wherein each retransmission of the plurality of retransmissions includes a respective subset of the set of code block groups included in the transport block transmitted in the initial transmission.

Aspect 12: The method of any of Aspects 6 or 11, wherein the communication is an uplink communication, and wherein communicating with the base station in the HARQ-less transmission mode comprises: transmitting, to the base station, data associated with the uplink communication in a first transport block having a first transport block size; receiving, from the base station, an uplink grant for retransmission of the uplink communication; and transmitting, to the base station, a first portion of the data associated with the uplink communication in a second transport block having a second transport block size determined based at least in part on a modulation and coding scheme and resource allocation indicated in the uplink grant for the retransmission of the uplink communication.

Aspect 13: The method of Aspect 12, wherein communicating with the base station in the HARQ-less transmission mode further comprises: receiving another uplink grant associated with a new uplink communication; and transmitting, to the base station, a third transport block associated with the new uplink communication, wherein the third transport block includes a second portion of the data associated with the uplink communication and other data from a medium access control buffer of the UE.

Aspect 14: The method of Aspect 6, wherein the communication is an uplink communication, and wherein communicating with the base station in the HARQ-less transmission mode comprises: transmitting, to the base station, data associated with the uplink communication; and removing the data associated with the uplink communication from a medium access control buffer of the UE without storing the data associated with the uplink communication in an uplink HARQ buffer of the UE.

Aspect 15: The method of any of Aspects 1-6 or 11-14, wherein the communication is an uplink communication, and wherein communicating with the base station comprises: transmitting, in the uplink communication, first data associated with a first logical channel based at least in part on a determination that the communication is associated with the HARQ-less transmission mode; or transmitting, in the uplink communication, second data associated with a second logical channel based at least in part on a determination that the communication is associated with the HARQ-based transmission mode.

Aspect 16: A method of wireless communication performed by a base station, comprising: transmitting, to a user equipment (UE), a grant for a communication with the base station; transmitting, to the UE, an indication of whether the communication is associated with a hybrid automatic repeat request (HARQ)-based transmission mode or a HARQ-less transmission mode; and communicating with the UE based at least in part on the grant and the indication of whether the communication is associated with the HARQ-based transmission mode or the HARQ-less transmission mode.

Aspect 17: The method of Aspect 16, wherein transmitting the indication comprises: transmitting via downlink control information associated with the grant, the indication of whether the communication is associated with the HARQ-based transmission mode or the HARQ-less transmission mode.

Aspect 18: The method of Aspect 17, wherein the indication is provided by at least one of: an indication in a dedicated field, in the DCI, for indicating whether the communication is associated with the HARQ-based transmission mode or the HARQ-less transmission mode, a radio network temporary identifier (RNTI) associated with the DCI, a DCI format associated with the DCI, an indication in at least one of a redundancy version field, a new data indicator field, or a HARQ process identifier field in the DCI, a control resource set (CORESET) in which the DCI associated with the grant is received, a slot index of a slot in which the DCI associated with the grant is received or a slot in which the communication is scheduled, or a control channel element (CCE) in which the DCI associated with the grant is received Aspect 19: The method of any of Aspects 16-18, wherein the indication includes an indication of one or more HARQ process identifiers that are associated with the HARQ-less transmission mode.

Aspect 20: The method of any of Aspects 16-19, transmitting the indication comprises: transmitting a configuration that indicates that all downlink communications or all uplink communications in a bandwidth part or a cell are associated with the HARQ-based transmission mode or the HARQ-less transmission mode.

Aspect 21: The method of any of Aspects 16-20, wherein communicating with the UE comprises: communicating with the UE in the HARQ-less transmission mode based at least in part on the indication indicating that the communication is associated with the HARQ-less transmission mode.

Aspect 22: The method of Aspect 21, wherein the communication is a downlink communication, and wherein communicating with the UE in the HARQ-less transmission mode comprises: transmitting, to the UE, one or more transmissions of the downlink communication, wherein each transmission of the one or more transmissions of the downlink communication is self-decodable without soft combining.

Aspect 23: The method of Aspect 22, wherein communicating with the UE in the HARQ-less transmission mode further comprises: receiving, from the UE, a respective acknowledgement (ACK) or negative acknowledgment (NACK) for each of the one or more transmissions of the downlink communication.

Aspect 24: The method of Aspect 22, wherein the one or more transmissions of the downlink communication include a plurality of transmissions of the downlink communication, and wherein communicating with the UE in the HARQ-less transmission mode further comprises: receiving, from the UE, an indication of a number of acknowledgements (ACKs) or a number of negative acknowledgments (NACKs) associated with the plurality of transmissions of the downlink communication.

Aspect 25: The method of Aspect 21, wherein the communication is an uplink communication, and wherein communicating with the UE in the HARQ-less transmission mode comprises: detecting a failure to correctly decode a transmission of the uplink communication from the UE; and refraining from storing log-likelihood ratio (LLR) information for the transmission of the uplink communication.

Aspect 26: The method of any of Aspects 21 or 25, wherein the communication is an uplink communication, and wherein communicating with the UE in the HARQ-less transmission mode comprises: receiving, from the UE, the uplink communication in an initial transmission of a transport block associated with the uplink communication, wherein the transport block is partitioned into a set of code block groups; transmitting, to the UE, one or more uplink grants for retransmission of the uplink communication based at least in part on a failure to successfully decode he transport block associated with the uplink communication; and receiving, from the UE, a plurality of retransmissions, wherein each retransmission of the plurality of retransmissions includes a respective subset of the set of code block groups included in the transport block transmitted in the initial transmission.

Aspect 27: The method of any of Aspects 21 or 25-26, wherein the communication is an uplink communication, and wherein communicating with the UE in the HARQ-less transmission mode comprises: receiving, from the UE, an uplink communication including a first transport block having a first transport block size, wherein the first transport block includes data associated with the uplink communication; transmitting, to the UE, an uplink grant for retransmission of the uplink communication based at least in part on a failure to correctly decode the first transport block; and receiving, from the UE, a first portion of the data associated with the uplink communication in a second transport block having a second transport block size determined based at least in part on a modulation and coding scheme and resource allocation indicated in the uplink grant for the retransmission of the uplink communication.

Aspect 28: The method of Aspect 27, wherein communicating with the UE in the HARQ-less transmission mode further comprises: transmitting, to the UE, another uplink grant associated with a new uplink communication; and receiving, from the UE, a third transport block associated with the new uplink communication, wherein the third transport block includes a second portion of the data associated with the uplink communication and other data from a medium access control buffer of the UE.

Aspect 29: The method of Aspect 21, wherein the communication is an uplink communication, and wherein communicating with the UE in the HARQ-less transmission mode comprises: transmitting, to the UE, an indication to disable repetitions for the uplink communication based at least in part on the communication being associated with the HARQ-less transmission mode; and receiving, from the UE, a transmission of the uplink communication.

Aspect 30: The method of any of Aspects 16-21 or 25-29, wherein the communication is an uplink communication, and wherein communicating with the UE comprises: receiving, in the uplink communication, first data associated with a first logical channel based at least in part on a determination that the communication is associated with the HARQ-less transmission mode; or receiving, in the uplink communication, second data associated with a second logical channel based at least in part on a determination that the communication is associated with the HARQ-based transmission mode.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: An apparatus for wireless communication at a device, comprising a processor; memory coupled with the processor; and instructions stored in the memory and executable by the processor to cause the apparatus to perform the method of one or more of Aspects 16-30.

Aspect 33: A device for wireless communication, comprising a memory and one or more processors coupled to the memory, the one or more processors configured to perform the method of one or more of Aspects 1-15.

Aspect 34: A device for wireless communication, comprising a memory and one or more processors coupled to the memory, the one or more processors configured to perform the method of one or more of Aspects 16-30.

Aspect 35: An apparatus for wireless communication, comprising at least one means for performing the method of one or more of Aspects 1-15.

Aspect 36: An apparatus for wireless communication, comprising at least one means for performing the method of one or more of Aspects 16-30.

Aspect 37: A non-transitory computer-readable medium storing code for wireless communication, the code comprising instructions executable by a processor to perform the method of one or more of Aspects 1-15.

Aspect 38: A non-transitory computer-readable medium storing code for wireless communication, the code comprising instructions executable by a processor to perform the method of one or more of Aspects 16-30.

Aspect 39: A non-transitory computer-readable medium storing a set of instructions for wireless communication, the set of instructions comprising one or more instructions that, when executed by one or more processors of a device, cause the device to perform the method of one or more of Aspects 1-15.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, the one or more processors individually or collectively configured to cause the UE to:
      receive, from a base station, a configuration of a set of logical channel prioritization restrictions for a set of logical channels, wherein each logical channel prioritization restriction indicates whether data in a respective logical channel is permitted to be mapped to a transmission associated with a hybrid automatic repeat request (HARQ)-based transmission mode or a HARQ-less transmission mode;
      receive, from the base station, a grant for a communication with the base station; and
      communicate with the base station based at least in part on the configuration, the grant and a determination of whether the communication is associated with the HARQ-based transmission mode or the HARQ-less transmission mode.

2. The UE of claim 1, wherein the one or more processors are further configured to cause the UE to:
   receive, via downlink control information (DCI) associated with the grant, an indication of whether the communication is associated with the HARQ-based transmission mode or the HARQ-less transmission mode, wherein the one or more processors, to determine whether the communication is associated with the HARQ-based transmission mode or the HARQ-less transmission mode, are configured to determine whether the communication is associated with the HARQ-based transmission mode or the HARQ-less transmission mode based at least in part on the indication.

3. The UE of claim 2, wherein the indication is provided by at least one of:
   an indication in a dedicated field, in the DCI, for indicating whether the communication is associated with the HARQ-based transmission mode or the HARQ-less transmission mode,
   a radio network temporary identifier (RNTI) associated with the DCI,
   a DCI format associated with the DCI,
   an indication in at least one of a redundancy version field, a new data indicator field, or a HARQ process identifier field in the DCI,
   a control resource set (CORESET) in which the DCI associated with the grant is received,
   a slot index of a slot in which the DCI associated with the grant is received or a slot in which the communication is scheduled, or
   a control channel element (CCE) in which the DCI associated with the grant is received.

4. The UE of claim 1, wherein the one or more processors are further configured to cause the UE to:
   receive, from the base station, an indication of one or more HARQ process identifiers that are associated with the HARQ-less transmission mode wherein the one or more processors, to determine whether the communication is associated with the HARQ-based transmission mode or the HARQ-less transmission mode, are configured to determine whether a HARQ process identifier associated with the grant is included in the one or more HARQ process identifiers that are associated with the HARQ-less transmission mode.

5. The UE of claim 1, wherein the one or more processors are further configured to cause the UE to:
receive, from the base station, a configuration that indicates that all downlink communications or all uplink communications in a bandwidth part or a cell are associated with the HARQ-based transmission mode or the HARQ-less transmission mode, wherein the one or more processors, to determine whether the communication is associated with the HARQ-based transmission mode or the HARQ-less transmission mode, are configured to determine whether the communication is associated with the HARQ-based transmission mode or the HARQ-less transmission mode based at least in part on the configuration.

6. The UE of claim 1, wherein the one or more processors, to communicate with the base station, are configured to cause the UE to:
communicate with the base station in the HARQ-less transmission mode based at least in part on a determination that the communication is associated with the HARQ-less transmission mode.

7. The UE of claim 6, wherein the communication is a downlink communication, and wherein the one or more processors, to communicate with the base station in the HARQ-less transmission mode, are configured to cause the UE to:
receive one or more transmissions of the downlink communication without buffering log-likelihood ratio (LLR) information for the one or more transmissions of the downlink communication; and
decode each transmission of the one or more transmissions of the downlink communication without using soft combining with another transmission of the one or more transmissions of the downlink communication.

8. The UE of claim 7, wherein the one or more processors, to communicate with the base station in the HARQ-less transmission mode, are further configured to cause the UE to:
transmit, to the base station, a respective acknowledgement (ACK) or negative acknowledgment (NACK) for each of the one or more transmissions of the downlink communication.

9. The UE of claim 7, wherein the one or more transmissions of the downlink communication include a plurality of transmissions of the downlink communication, and wherein the one or more processors, to communicate with the base station in the HARQ-less transmission mode, are further configured to cause the UE to:
transmit, to the base station, an indication of a number of acknowledgements (ACKs) or a number of negative acknowledgments (NACKs) associated with the plurality of transmissions of the downlink communication.

10. The UE of claim 6, wherein the communication is a downlink communication, and wherein the one or more processors, to communicate with the base station in the HARQ-less transmission mode, are configured to cause the UE to:
detect a failure to correctly decode a transmission of the downlink communication from the base station; and
refrain from storing log-likelihood ratio (LLR) information for the transmission of the downlink communication based at least in part on the determination that the communication is associated with the HARQ-less transmission mode.

11. The UE of claim 6, wherein the communication is an uplink communication, and wherein the one or more processors, to communicate with the base station in the HARQ-less transmission mode, are configured to cause the UE to:
transmit, to the base station, the uplink communication in an initial transmission of a transport block associated with the uplink communication, wherein the transport block is partitioned into a set of code block groups;
receive, from the base station, one or more uplink grants for retransmission of the uplink communication; and
re-transmit, to the base station, the uplink communication in a plurality of retransmissions, wherein each retransmission of the plurality of retransmissions includes a respective subset of the set of code block groups included in the transport block transmitted in the initial transmission.

12. The UE of claim 6, wherein the communication is an uplink communication, and wherein the one or more processors, to communicate with the base station in the HARQ-less transmission mode, are configured to cause the UE to:
transmit, to the base station, data associated with the uplink communication in a first transport block having a first transport block size;
receive, from the base station, an uplink grant for retransmission of the uplink communication; and
transmit, to the base station, a first portion of the data associated with the uplink communication in a second transport block having a second transport block size determined based at least in part on a modulation and coding scheme and resource allocation indicated in the uplink grant for the retransmission of the uplink communication.

13. The UE of claim 12, wherein the one or more processors, to communicate with the base station in the HARQ-less transmission mode, are further configured to cause the UE to:
receive another uplink grant associated with a new uplink communication; and
transmit, to the base station, a third transport block associated with the new uplink communication, wherein the third transport block includes a second portion of the data associated with the uplink communication and other data from a medium access control buffer of the UE.

14. The UE of claim 6, wherein the communication is an uplink communication, and wherein the one or more processors, to communicate with the base station in the HARQ-less transmission mode, are configured to cause the UE to:
transmit, to the base station, data associated with the uplink communication; and
remove the data associated with the uplink communication from a medium access control buffer of the UE without storing the data associated with the uplink communication in an uplink HARQ buffer of the UE.

15. The UE of claim 1, wherein the communication is an uplink communication, and wherein the one or more processors, to communicate with the base station, are configured to cause the UE to:
transmit, in the uplink communication, first data associated with a first logical channel based at least in part on the configuration and a determination that the communication is associated with the HARQ-less transmission mode; or
transmit, in the uplink communication, second data associated with a second logical channel based at least in part on that configuration and a determination that the communication is associated with the HARQ-based transmission mode.

16. A base station for wireless communication, comprising:
one or more memories; and
one or more processors, coupled to the one or more memories, the one or more processors individually or collectively configured to cause the base station to:
transmit, to a user equipment (UE), a configuration of a set of logical channel prioritization restrictions for a set of logical channels, wherein each logical channel prioritization restriction indicates whether data in a respective logical channel is permitted to be mapped to a transmission associated with a hybrid automatic repeat request (HARQ)-based transmission mode or a HARQ-less transmission mode;
transmit, to the UE, a grant for a communication with the base station;
transmit, to the UE, an indication of whether the communication is associated with the HARQ-based transmission mode or the HARQ-less transmission mode; and
communicate with the UE based at least in part on the configuration, the grant and the indication of whether the communication is associated with the HARQ-based transmission mode or the HARQ-less transmission mode.

17. The base station of claim 16, wherein the one or more processors, to communicate with the UE, are configured to cause the base station to:
communicate with the UE in the HARQ-less transmission mode based at least in part on the indication indicating that the communication is associated with the HARQ-less transmission mode.

18. The base station of claim 17, wherein the communication is a downlink communication, and wherein the one or more processors, to communicate with the UE in the HARQ-less transmission mode, are configured to cause the base station to:
transmit, to the UE, one or more transmissions of the downlink communication, wherein each transmission of the one or more transmissions of the downlink communication is self-decodable without soft combining.

19. The base station of claim 17, wherein the communication is an uplink communication, and wherein the one or more processors, to communicate with the UE in the HARQ-less transmission mode, are configured to cause the base station to:
detect a failure to correctly decode a transmission of the uplink communication from the UE; and
refrain from storing log-likelihood ratio (LLR) information for the transmission of the uplink communication.

20. The base station of claim 17, wherein the communication is an uplink communication, and wherein the one or more processors, to communicate with the UE in the HARQ-less transmission mode, are configured to cause the base station to:
receive, from the UE, the uplink communication in an initial transmission of a transport block associated with the uplink communication, wherein the transport block is partitioned into a set of code block groups;
transmit, to the UE, one or more uplink grants for retransmission of the uplink communication based at least in part on a failure to successfully decode he transport block associated with the uplink communication; and
receive, from the UE, a plurality of retransmissions, wherein each retransmission of the plurality of retransmissions includes a respective subset of the set of code block groups included in the transport block transmitted in the initial transmission.

21. The base station of claim 17, wherein the communication is an uplink communication, and wherein the one or more processors, to communicate with the UE in the HARQ-less transmission mode, are configured to cause the base station to:
receive, from the UE, an uplink communication including a first transport block having a first transport block size, wherein the first transport block includes data associated with the uplink communication;
transmit, to the UE, an uplink grant for retransmission of the uplink communication based at least in part on a failure to correctly decode the first transport block; and
receive, from the UE, a first portion of the data associated with the uplink communication in a second transport block having a second transport block size determined based at least in part on a modulation and coding scheme and resource allocation indicated in the uplink grant for the retransmission of the uplink communication.

22. The base station of claim 21, wherein the one or more processors, to communicate with the UE in the HARQ-less transmission mode, are configured to cause the base station to:
transmit, to the UE, another uplink grant associated with a new uplink communication; and
receive, from the UE, a third transport block associated with the new uplink communication, wherein the third transport block includes a second portion of the data associated with the uplink communication and other data from a medium access control buffer of the UE.

23. The base station of claim 17, wherein the communication is an uplink communication, and wherein the one or more processors, to communicate with the UE in the HARQ-less transmission mode, are configured to cause the base station to:
transmit, to the UE, an indication to disable repetitions for the uplink communication based at least in part on the communication being associated with the HARQ-less transmission mode; and
receive, from the UE, a transmission of the uplink communication.

24. The base station of claim 16, wherein the communication is an uplink communication, and wherein the one or more processors, to communicate with the UE, are configured to cause the base station to:
receive, in the uplink communication, first data associated with a first logical channel based at least in part on the configuration and a determination that the communication is associated with the HARQ-less transmission mode; or
receive, in the uplink communication, second data associated with a second logical channel based at least in part on the configuration and a determination that the communication is associated with the HARQ-based transmission mode.

25. A method of wireless communication performed by a user equipment (UE), comprising:
receiving, from a base station, a configuration of a set of logical channel prioritization restrictions for a set of logical channels, wherein each logical channel prioritization restriction indicates whether data in a respective logical channel is permitted to be mapped to a transmission associated with a hybrid automatic repeat request (HARQ)-based transmission mode or a HARQ-less transmission mode;

receiving, from the base station, a grant for a communication with the base station;

communicating with the base station based at least in part on the configuration, the grant, and a determination of whether the communication is associated with the HARQ-based transmission mode or the HARQ-less transmission mode.

26. The method of claim 25, wherein communicating with the base station comprises:

communicating with the base station in the HARQ-less transmission mode based at least in part on a determination that the communication is associated with the HARQ-less transmission mode.

27. The method of claim 26, wherein the communication is a downlink communication, and wherein communicating with the base station in the HARQ-less transmission mode comprises:

detecting a failure to correctly decode a transmission of the downlink communication from the base station; and refraining from storing log-likelihood ratio (LLR) information for the transmission of the downlink communication based at least in part on the determination that the communication is associated with the HARQ-less transmission mode.

28. The method of claim 26, wherein the communication is an uplink communication, and wherein communicating with the base station in the HARQ-less transmission mode comprises:

transmitting, to the base station, the uplink communication in an initial transmission of a transport block associated with the uplink communication, wherein the transport block is partitioned into a set of code block groups;

receiving, from the base station, one or more uplink grants for retransmission of the uplink communication; and re-transmitting, to the base station, the uplink communication in a plurality of retransmissions, wherein each retransmission of the plurality of retransmissions includes a respective subset of the set of code block groups included in the transport block transmitted in the initial transmission.

29. The method of claim 26, wherein the communication is an uplink communication, and wherein communicating with the base station in the HARQ-less transmission mode comprises:

transmitting, to the base station, data associated with the uplink communication in a first transport block having a first transport block size;

receiving, from the base station, an uplink grant for retransmission of the uplink communication; and transmitting, to the base station, a first portion of the data associated with the uplink communication in a second transport block having a second transport block size determined based at least in part on a modulation and coding scheme and resource allocation indicated in the uplink grant for the retransmission of the uplink communication.

30. A method of wireless communication performed by a base station, comprising:

transmitting, to a user equipment (UE), a configuration of a set of logical channel prioritization restrictions for a set of logical channels, wherein each logical channel prioritization restriction indicates whether data in a respective logical channel is permitted to be mapped to a transmission associated with a hybrid automatic repeat request (HARQ)-based transmission mode or a HARQ-less transmission mode;

transmitting, to the UE, a grant for a communication with the base station;

transmitting, to the UE, an indication of whether the communication is associated with the HARQ-based transmission mode or the HARQ-less transmission mode; and communicating with the UE based at least in part on the grant and the indication of whether the communication is associated with the HARQ-based transmission mode or the HARQ-less transmission mode.

* * * * *